US012786106B2

(12) United States Patent
Ran

(10) Patent No.: US 12,786,106 B2

(45) Date of Patent: Nov. 3, 2026

(54) SEGMENTED LINK TRAINING

(71) Applicant: Cisco Technology, Inc., San Jose, CA (US)

(72) Inventor: Adee O. Ran, Maayan Baruch (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 283 days.

(21) Appl. No.: 18/432,312

(22) Filed: Feb. 5, 2024

(65) Prior Publication Data

US 2025/0141782 A1 May 1, 2025

Related U.S. Application Data

(60) Provisional application No. 63/594,154, filed on Oct. 30, 2023.

(51) Int. Cl.
*H04L 45/02* (2022.01)
*H04L 45/00* (2022.01)
*H04L 45/24* (2022.01)

(52) U.S. Cl.
CPC .................................... *H04L 45/24* (2013.01)

(58) Field of Classification Search
CPC .......... H04L 45/24; H04L 45/02; H04L 45/20
See application file for complete search history.

(56) References Cited

U.S. PATENT DOCUMENTS 11,424,968 B1 * 8/2022 Sun ..................... H04L 25/4908
2014/0043957 A1 * 2/2014 Venkatraman ...... H04L 41/0661 370/216
2014/0146833 A1 * 5/2014 Lusted .................. H04L 12/413 370/437
2015/0295679 A1 * 10/2015 Valliappan ............ H04L 1/0075 370/252
2018/0181502 A1 * 6/2018 Jen ...................... G06F 13/4022
2018/0227149 A1 * 8/2018 Johnson ............ H04L 25/03019
2019/0104057 A1 * 4/2019 Goel .................. H04L 43/0817
2019/0386851 A1 * 12/2019 Dai ..................... H04L 49/3054
2020/0226084 A1 * 7/2020 Das Sharma ......... G06F 13/362
2020/0259936 A1 * 8/2020 Lusted ................ H04L 49/3054

(Continued)

OTHER PUBLICATIONS

Partial International Search Report for International Application No. PCT/US2024/052474, mailed Jan. 28, 2025, 12 pages.

(Continued)

*Primary Examiner* — Chris Parry
*Assistant Examiner* — Hassan Abdur-Rahman Khan
(74) *Attorney, Agent, or Firm* — Edell, Shapiro & Finnan, LLC

(57) ABSTRACT

Techniques are provided to extend training to an end-to-end method, where a ready-to-send (RTS) variable is added to training frames to indicate that, on a current interface, the Physical Medium Attachment (PMA) sublayer, with all its lanes, has valid data and appropriate clock timing and is ready to send data to the output when training is completed. These techniques are applicable to a PMA that is an endpoint (and thus has only a single network interface involved) as well as to PMAs that have two network interfaces connected to segment partners. Moreover, these techniques may be configured to work with legacy devices that do not support segmented link training.

27 Claims, 35 Drawing Sheets

(56) References Cited

U.S. PATENT DOCUMENTS

| | | | | |
|---|---|---|---|---|
| 2021/0243050 | A1 | 8/2021 | Dai et al. | |
| 2024/0056380 | A1* | 2/2024 | Rechtman | H04L 45/02 |

OTHER PUBLICATIONS

IEEE: "IEEE P802.3ck D1.3 100/200/400 GB/s Electrical Interfaces Task Force 4th Task Force review comments", Sep. 24, 2020, 53 pages.
Lusted K., "CI 136.8.11 Link Training Issue", Jul. 2020, 7 pages.
Lusted K., "Link Training Baseline for Eight-lane PMDs", IEEE P802.3df Task Force, Sep. 2022, 19 pages.
Ran A., et al., "Baseline Proposal for In-band Training Functions for 200 GB/s Per Lane Electrical Interfaces", IEEE P802.3dj, Jan. 2024 Interim, 13 pages.
Rechtman Z., et al., "CL 136 Link Training—Update Request Behavior", IEEE P802.3cd Task Force, Jul. 2017, 9 Pages.
Slavick J., "Link Training Baseline", IEEE P802.3ck Task Force, Broadcom, May 2019 Interim, 2 Pages.
Xena Networks: "PAM4 AN-LT", White Paper, May 2020, 11 Pages.
International Search Report and Written Opinion for International Application No. PCT/US2024/052474, mailed Apr. 8, 2025, 25 pages.
Samaan S.B., et al., "High-speed Serial Bus Repeater Primer, Re-driver and Re-timer Micro-architecture, Properties, and Usage", Intel Corporation, XP055425722, ISBN: 978-0-85296-999-1, https://www.intel.com/content/dam/www/public/us/en/documents/white-papers/serial-bus-white-paper.pdf, Oct. 2015, 72 pages.

* cited by examiner

| | | |
|---|---|---|
| BITS 15:7 – OTHER PURPOSES | | |
| 6 | EXTEND TRAINING | 1 = NO DATA IS AVAILABLE, CONTINUE TRAINING (RTS=0)<br>0 = SWITCH TO DATA WHEN TRAINING IS COMPLETED (RTS=1) |
| BITS 5:0 - OTHER PURPOSES | | |

FIG.7

SEGMENTED LINK TRAINING

CROSS-REFERENCE TO RELATED APPLICATION

This application claims priority to U.S. Provisional Application No. 63/594,154, filed Oct. 30, 2023, the entirety of which is incorporated by reference.

TECHNICAL FIELD

The present disclosure relates to network communication.

BACKGROUND

Training, as used herein, refers to any method by which a receiver's performance is improved by modifying the transmitter's signaling characteristics.

Ethernet has a specified link training method for non-segmented links, such as backplane and copper cables, such as that defined in clause 136.8.11 ("PMD control function") of IEEE 802.3cd (IEEE 802.3cd-2018). This method cannot be used for links that comprise multiple segments, such as when retimers are present in the link. Therefore, training of multiple segments within an Ethernet link is not supported by the standard. Specific examples are the Ethernet original Physical Media Dependent (PMD) sublayer control function for a backplane physical layer (PHY), specified in clause 72.6.10 of IEEE 802; subsequent similar specifications for higher data rates, clauses 92.7.12 and 136.8.11; management-based "transmitter equalization feedback" specified for Chip Attachment Unit Interface (CAUI-4) chip-to-chip, in 83D.5; and Common Management Interface Specification (CMIS) Link Training, CMIS-LT.

BRIEF DESCRIPTION OF THE DRAWINGS

FIG. 7 is a diagram depicting how ready-to-send indication information may be included within a training frame defined by IEEE 802.3, Clause 136, Table 162-10 ("Status Field Structure"), according to an example embodiment.

DETAILED DESCRIPTION

Overview

Figure 1:
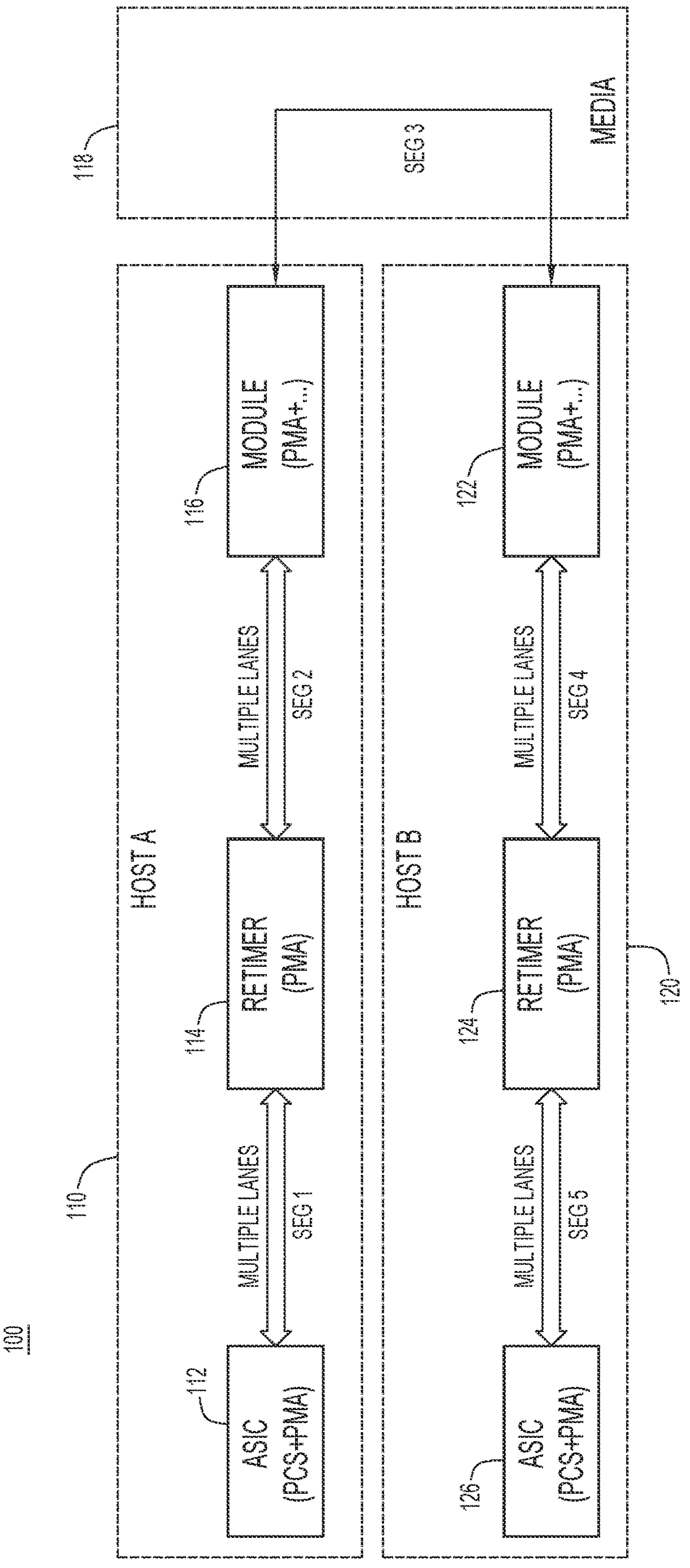
FIG. 1 is a block diagram of a multi-segmented network arrangement in which one or more devices are configured to perform the segmented link training techniques presented herein, according to an example embodiment.

Techniques are provided to extend training to an end-to-end method, where a ready-to-send (RTS) variable is added to training frames to indicate that, on a current interface, the Physical Medium Attachment (PMA) sublayer, with all its lanes, has valid data and appropriate clock timing and is ready to send data to the output when training is completed. These techniques are applicable to a PMA that is an endpoint (and thus has only a single network interface involved) as well as to PMAs that have two network interfaces connected to segment partners. Moreover, these techniques may be configured to work with legacy devices that do not support segmented link training.

In one form, a method is provided for a device that is part of a multi-segment network link but has only one network interface in the link (i.e., it is an end point) on the link, the method involving: on a network interface facing a segment partner, receiving incoming training frames from the segment partner and transmitting outgoing training frames to the segment partner; and including a ready-to-send indication in an outgoing training frame to be sent to the segment partner, wherein the ready-to-send indication indicates that the device has, on all lanes of the network interface, valid data and is ready to send data on the network interface to the segment partner.

In another form, a method is provided for a device that is part of a multi-segment network link but has two interfaces in the link (i.e., it is mid-point) on the link. The method involves: on a first network interface facing a first segment partner, receiving incoming training frames from the first segment partner and transmitting outgoing training frames to the first segment partner; on a second network interface facing a second segment partner, receiving incoming training frames from the second segment partner and transmitting outgoing training frames to the second segment partner; first including a first ready-to-send indication, when the first ready-to-send indication is included in an incoming training frame received from the first segment partner, in an outgoing training frame to be sent to the second segment partner; and second including a second ready-to-send indication, when the second ready-to-send indication is included in an incoming training frame received from the second segment partner, in an outgoing training frame to be sent to the first segment partner.

In accordance with still another aspect, a method is provided that is performed by a device that is a mid-point of a multi-segment network link, and one of its segment partners connected to one of its two network interfaces, is not enabled to perform the segment-based training techniques presented herein. The method involves: disabling a first transmitter on a first network interface of the device for a period of time; disabling a second transmitter on a second network interface of the device; on a first network interface facing a first segment partner, receiving incoming training frames from the first segment partner; after the period of time, enabling the first transmitter on the first network interface and transmitting outgoing training frames to the first segment partner; when a first ready-to-send indication is included in an incoming training frame received from the first segment partner, enabling the second transmitter and transmitting a binary pattern from a second network interface to a second segment partner; and when a receiver ready indication is determined for the second segment partner, including a second ready-to-send indication in an outgoing training frame transmitted to the first segment partner.

Arrangements for devices configured to perform these methods are also presented herein.

Example Embodiments

Link bring-up in systems that include multiple segments is usually implemented without training, and is heavily dependent on management software that is implemented separately from the serializer-deserializer (SerDes), which can be difficult to integrate and debug. In addition, these algorithms are proprietary and may have compatibility challenges with other products. This may result in sub-optimal bit error rate (BER) and prolonged development times.

Again, training refers to enabling a receiver to tell the transmitter, on the other side, to adjust the transmit signal so that the receiver receives it appropriately. If the signal is too strong, the receiver may ask the transmitter to attenuate the signal or it may ask the transmitter to adjust the equalization of the signal. This training happens before data is sent to the receiver to adjust the signal characteristics for the signal sent by the transmitter, for the receiver's benefit. The signal affected during training may be an electrical signal or an optical signal. During training, training frames are sent between the two link partners. This can take some time, e.g., several seconds. At some point, each of the receivers can indicate training is done, such as by sending a link ready signal to the link partner when it is done training and ready. When the status on both sides of the link is ready, then the link can be brought and data can start being sent.

When the link is not end-to-end link that is guaranteed to have data from both ends, link training as it currently stands cannot be used. For example, there may be no received data on the optical link to transmit toward the host, or there is no device on the other side of the optical link sending data.

The Physical Media Dependent (PMD) sublayer control function is suitable for a single end-to-end electrical channel. The PMD control function was originally coupled with an auto-negotiation state diagram. When training is completed, the PMD switches to DATA mode—and sends its input (originally assumed to be the co-packaged Physical Coding Sublayer (PCS) and Physical Medium Attachment (PMA) sublayer (PCS+PMA output) in the transmit direction to the media. The auto-negotiation (AN) time for link training is limited by a link_fail_inhibit_timer (originally 500 ms, in IEEE 802.3ck PMDs: 12 seconds). Auto-negotiation is defined in Clause 73 of IEEE 802.3, and is a communication protocol that enables exchanging information about data rates available on each side and thus finding the highest common data rate. After the data rate is established, training is performed at this data rate. AN can be disabled if both sides are pre-configured to one data rate. Training can be used in this case too. Clause 136 link training can be used without AN, but is similarly constrained in time, and also assumes that data is immediately available.

An Attachment Unit Interface-Chip-to-Chip (AUI-C2C) could be present between the PMD and the PCS. The PMD resides within the "chip" (e.g., retimer), so the retimer performs the PMD link training with the partner. The AUI (possibly on both sides) needs to be fully active beforehand, otherwise when switching to DATA mode the PMD has nothing to transmit. Thus, any AUI training should already be completed and achieve an acceptable AUI BER. This dependency also means that autonomous link training by the PMD can be done only with known signaling rates (making AN useless).

In-band "PMD control" cannot be used for AUIs. If Clause 136 in-band training was used, the problem is the same—the adjacent segments need to be active beforehand. There is no alternative training protocol specified for the AUIs.

AUI-Chip-to-Module (C2M) links can be optimized using module management, e.g., CMIS. Training can use locally generated test patterns such as the PRBS31Q test pattern. This pattern is defined as optional in the Ethernet standard, but is ubiquitously implemented. The training-related variables defined in Clause 136 could theoretically be exchanged between PMAs using management registers (see IEEE 802.3ck, 120F.3.1.4).

However, this has not been widely adopted. The Optical Internetworking Forum (OIF) CMIS-LT project is in progress but it is unclear if it will follow the same direction.

Moreover, this approach has several drawbacks. Management and SerDes are separated in many aspects, making it difficult to integrate. Using management to exchange requests and set the transmitter on both sides (as proposed for CMIS-LT) creates proprietary, long and complex out-of-band management workflows to be implemented in high-layer software. Centralized management in large systems creates bottlenecks, and is difficult to debug. This can have a substantial impact on software development time. An out-of-band (OOB) solution should ideally be a backup plan, not used as the first choice.

In summary, using retimers and AUIs within physical layers is not fully covered by existing standards. Although there are implementations that include retimers, they are relatively rare and not straightforward. Similar problems are expected if in-band "link training" is to be performed on AUI-C2M in optical PHYs. Out-of-band training is not a sufficient solution. The issues of the Clause 136 in-band link training are: auto switching to DATA when training is completed, and lack of indication of availability of data to be sent.

Reference is now made to FIG. 1, which shows a block diagram of a system 100 in which techniques presented herein may be employed to facilitate segmented link training. System 100 includes a multi-segment link as will be described. For example, in Host A shown at reference numeral 110, there is an application specific integrated circuit (ASIC) 112 that performs PCS and PMA functions, a retimer 114 that performs PMA related functions, and a module 116 (e.g., an optical transceiver module) that performs a variety of PMA and other functions to transmit and receive signals over a physical media (e.g., an optical fiber media) 118. Similarly, Host B shown at reference numeral 120 includes a module 122, a retimer 124 and an ASIC 126. In the example arrangement of system 100, the end-to-end link contains five (5) segments: Segment 1 (Seg 1) between ASIC 112 and retimer 114, Seg 2 between retimer 114 and module 116, Seg 3 between module 116 and module 122, Seg 4 between module 122 and retimer 124 and Seg 5 between retimer 124 and ASIC 126.

The ASIC 112 may exchange data with a media access control (MAC) layer at 800 Gbps (e.g., 800GMII), and may use an AUI-C2C interface across multiple lanes for communication with the retimer 114. Moreover, the retimer 114 may communicate with the module 116 via an AUI-C2M interface across multiple lanes. The module 116 may communicate with the module 122 via a PMD to PMD interface, such as using the 400GBASE-DR4 standard. The devices in Host B may communicate between each other, across multiple lanes, using similar technology used in Host A.

In current and future generations, not all modules are "known" to the host and different modules (from different vendors) may use different parameters for signals. Each of the segments may benefit from training, but there is no single management entity that can orchestrate all the segments. The segments within a host need to complete training before sending data to a link partner, across the physical media. Ideally, each segment should train autonomously and training can occur in any order. If there is a standardized procedure for link training in a multi-segment environment such as that shown in FIG. 1, then the various functions for each segment can better interoperate. For example, when a module is plugged in, the module is expected to start communicating with the host, start the training, and then once training is done, it should enable the optical output over the physical media. This is not standardized today. It is not clear today when the optical module should turn on its optical signal to send data to its link partner.

At 200 Gb/s per lane, and more than 30 dB insertion loss, training on AUIs (including chip-to-module (C2M)) may be just as important as between CR/KR PMDs, where, in Ethernet nomenclature, CR denotes Ethernet over copper cable assemblies with a reach of a few meters and KR denotes Ethernet over backplanes (printed circuit boards and connectors). The module-to-module link creation involves both sides to transmit a valid signal. A module that does not detect a signal may (and typically does) squelch its output. AUI training involves a valid signal and this can be handled using a test pattern generated by the module until a signal is detected.

The link partner might not be active while the AUI training is performed. This can happen on both sides (e.g., medium is disconnected). Bringing up a link involves sequencing of training completion, signal detect, and transmitter disable/enable. Again, all that can be done using centralized management, but that creates unnecessary burden on system software. A decentralized solution may be preferable.

Each PMA sublayer with a physical interface (AUI or PMD) has a handshake logic function on that interface. PMAs with two interfaces, such as retimers, have separate handshake functions, one for each interface. The handshake logic function manages how a state, called Ready to Send (RTS), is propagated segment-by-segment as each segment is trained, and then across the link to the link partner and its segments.

Figure 2A:
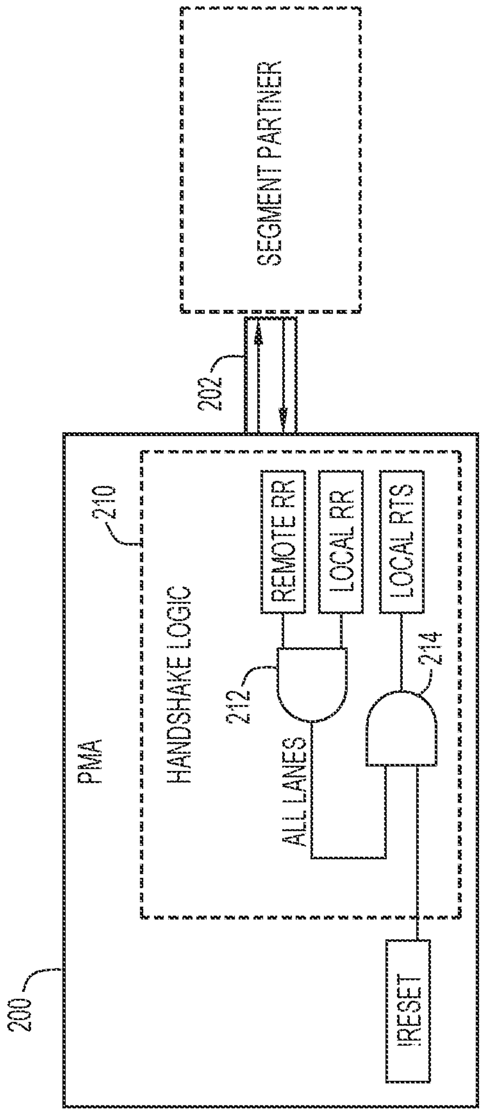
FIG. 2A is a diagram of handshake logic configured to relay ready-to-send indications for a device that has one interface connected in a multi-segmented link, according to an example embodiment.

Reference is made to FIG. 2A, which shows a block diagram of handshake logic provided in a PMA sublayer 200 that has a single network interface 202 to an adjacent segment (segment partner). The network interface 202 enables communications in the egress direction from the PMA sublayer 200 to the segment partner and in the ingress direction from the segment partner to the PMA sublayer 200. This would be applicable for the PMA sublayer functions of the ASIC 112 and ASIC 126 in FIG. 1, for example. The state variables in the handshake logic 210 are:

Receiver ready (RR)

Ready-to-send (RTS)

RR indicates that the PMA receiver can receive data (including successful completion of training if required). To extend the training to an end-to-end method, the RTS variable is added to indicate that, on the current interface, the PMA (with all its lanes) has valid data and appropriate clock timing and is ready to send data to the output when handshake (training) is completed.

The handshake logic 210 includes two AND gates 212 and 214. AND gate 212 receives as input Remote Receiver Ready (RR) obtained from a segment partner and Local RR of the PMA 200. The AND gate 212 generates an output across all lanes of the PMA 200 that is supplied as input to AND gate 214. The intent of the expression "all lanes" as used herein is that when there are multiple lanes, the output of the AND gate 212 indicates that all lanes have both local RR and remote RR. The AND gate 214 also receives as input a !reset signal generated internally by the PMA 200 and generates as output a Local Ready to Send (RTS) value. Thus, in a PMA 200 with a single interface, the Local RTS is set to 1 when Local RR and Remote RR are 1 on all lanes of the interface.

Figure 2B:
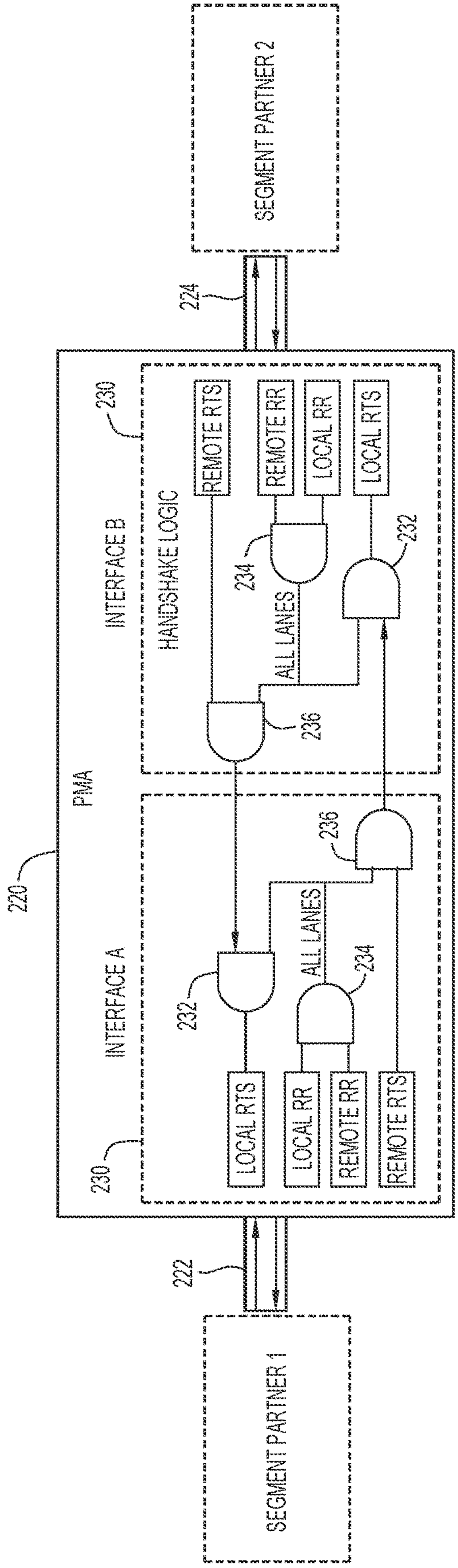
FIG. 2B is a diagram of handshake logic configured to relay ready-to-send indications between segments for a device that has two interfaces connected in a multi-segmented link, according to an example embodiment.

FIG. 2B illustrates handshake logic provided in a PMA sublayer 220 that has a two interfaces 222 and 224 referred to as Interface A and Interface B, each supporting bi-directional communications as illustrated. For each interface, e.g., Interface A and Interface B, handshake logic 230 is provided. Interface A is connected to segment partner 1 and Interface B is connected to segment partner 2. The handshake logic 230 for each interface is the same, and includes AND gates 232, 234 and 236. AND gate 232 receives as input the output of AND gate 236 from handshake logic for other interface as well as the output of AND gate 234, and outputs a Local RTS value. AND gate 234 receives as input Local RR and Remote RR (the RR from the segment partner) and generates an output for all lanes (where the "all lanes" has the same meaning as mentioned above), that is supplied as input to AND gate 232 and to an input AND gate 236. AND gate 236 also receives as input the Remote RTS (from the segment partner) and generates an output that is provided to the AND gate 232 for the other interface. In operation, on the Interface A, Local RTS is set to 1 when Local RR and Remote RR are 1 on all lanes of both interfaces, and when Remote RTS=1 is received on Interface B. Likewise, on Interface B, Local RTS is set to 1 when Local RR and Remote RR are 1 on all lanes of both interfaces, and when Remote RTS=1 is received on the Interface A.

Thus, each handshake logic 230 has per-interface local and remote versions of each of RR and RTS. RR is per lane and RTS is common for all lanes. The Remote RTS is exchanged as part of the training frames that are sent between each segment.

Figure 3:
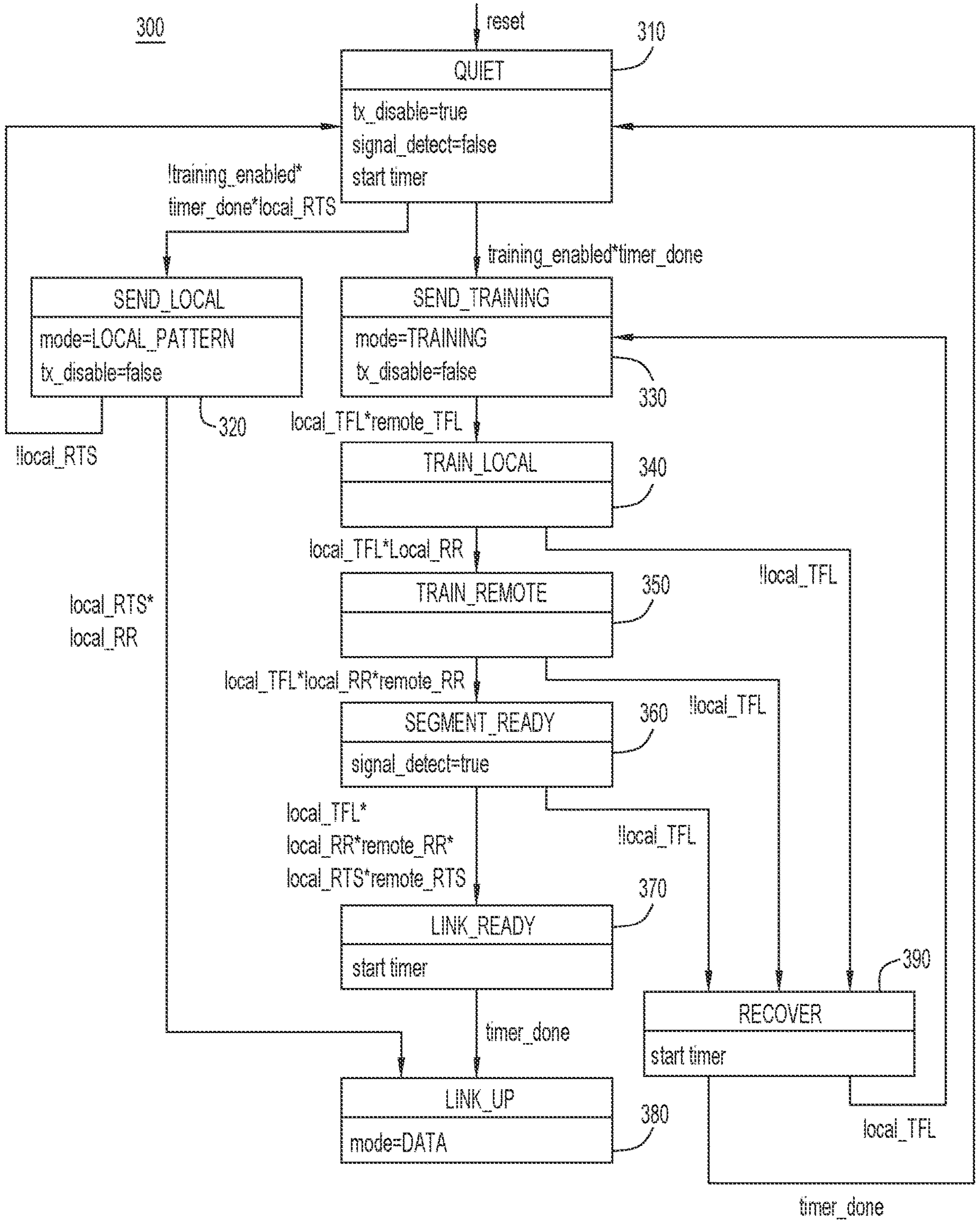
FIG. 3 illustrates a state diagram depicting operation of a device in performing the segmented link training techniques presented herein, according to an example embodiment.

Reference is now made to FIG. 3, with continued reference to FIG. 2, for a description of a modified clause 136 PMD control state diagram 300 that employs the Segment_Ready state and the associated new RTS variable. The modified PMD control state diagram 300 includes a Quiet state 310, Send_Local state 320, Send_Training state 330, Train_Local state 340, Train_Remote state 350, the new Segment_Ready state 360, Link_Ready state 370, Link_Up state 380 and Recover state 390.

Using RR, a single segment can be brought up, with the state diagram of FIG. 3. To extend the training to an end-to-end method, the RTS variable is added, as described above, to indicate that, on the current interface, the PMA (with all its lanes) has valid data and appropriate clock timing and is ready to send data to the output when handshake is completed. The handshake logic block in the PMA adjacent to the PCS has Local_RTS=true (if the PCS is enabled). Other handshake functions have Local_RTS=true if:

The interface in the other direction has Remote RR is true Local RR is true (all lanes are up, and if training is used, it completed successfully), and The interface in the other direction has Remote_RTS=true (it is ready to send data).

As a result, when a segment is up, the RTS is propagated by the PMAs in both directions, and this is depicted in FIG. 2B.

If handshake signaling is available on an interface, variables are communicated to the segment partner using the handshake protocol. Handshake signaling continues until RTS and all RR are true in both local and remote. Then (after a delay), the PMA switches to its normal functionality in both directions. There is no specified timeout in waiting for RR/RTS. A management process can access devices and restart link-up on a specific segment if desired.

If handshake signaling is not available on an interface (disabled, or not defined for the interface type), then:

Signal_Detect is inferred from the IS_SIGNAL status variable of the interface input (true if signal_ok, false otherwise)

Remote_RTS is assigned 1 (it is assumed that any incoming signal is PCS data).

The output on that interface is enabled or disabled to indicate Local_RTS to the partner.

In the link up state flow used today, without the solution presented herein, a Receiver Ready on the Local and Remote was enough to jump to the Link_Ready state 370. The Segment_Ready state 360 did not exist. Segment_Ready state 360 prevents data from being sent until all segments of an end-to-end link are in a RTS true state. Segment_Ready state 360 means that the current segment being trained has completed training. The receivers on both sides of the segment are satisfied with the transmitter configuration on the other side, but there is not necessarily any data to be sent. A segment could continue transmitting training frames until there is some data to be sent. A device knows that there is data to be sent and to stop sending training frames when it receives an additional bit that is exchanged between the two sides of the segment, the aforementioned RTS value.

The handshake function is mandatory for all PMAs, but a handshake signaling protocol (that enables segment training) may not always be available. This may depend on medium or interface type, and details of handshake signaling may be different. Even if available, handshake protocol functionality may be disabled and replaced by squelch and energy detection functions (but similar to bypassing training, it has to be done on both ends of a segment). Devices that use handshake protocol on one interface but not on the other may use a locally generated pattern for the non-handshake interface (instead of forwarding the incoming handshake protocol), as described below.

The proposed method can be implemented in multiple types of handshake signaling. It can work with "legacy" segments that use squelching instead (but on such segments training will not be available). As an example, the handshake signaling function can be based on Clause 136 PMD management, with local pattern generation and detection logic. Local clock generation ability is assumed; retimers use a recovered clock for transmission if available, or a local clock otherwise.

Figure 4A:
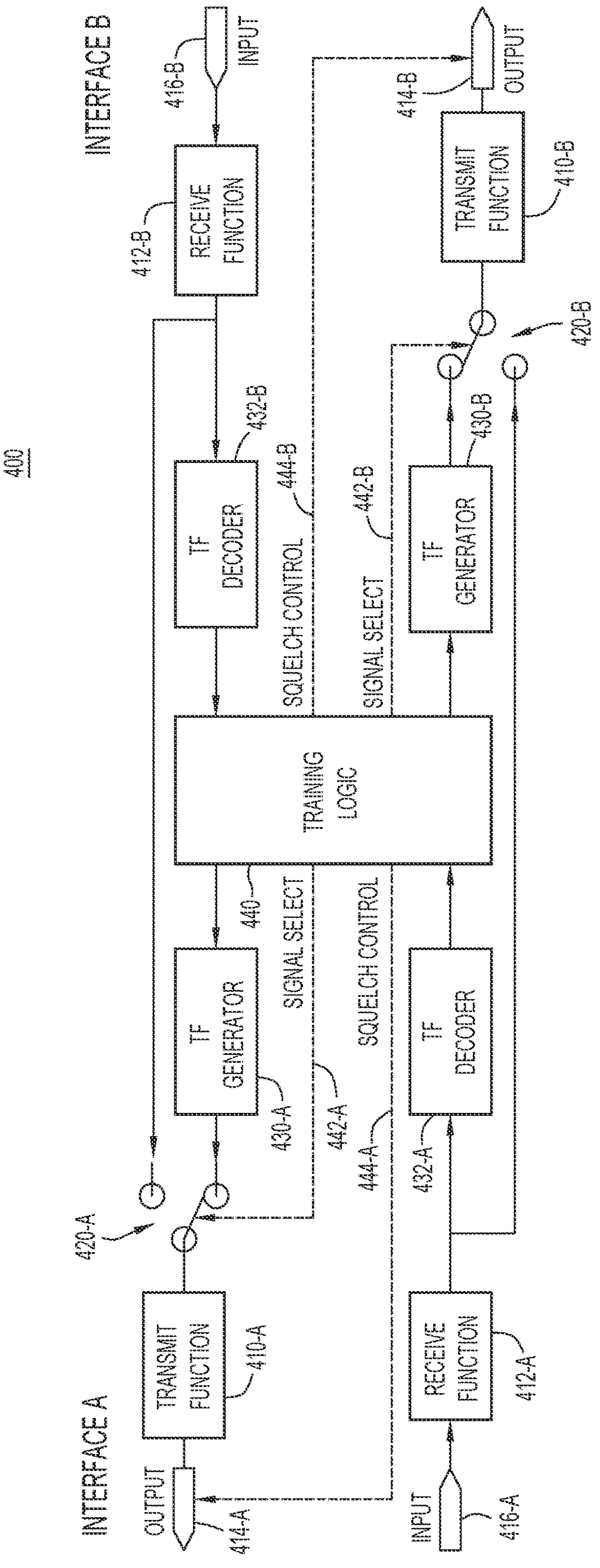
FIG. 4A is a block diagram of hardware components of a device configured to relay ready-to-send indications with segment partners capable of training on both network interfaces of the device, according to an example embodiment.
Figure 4B:
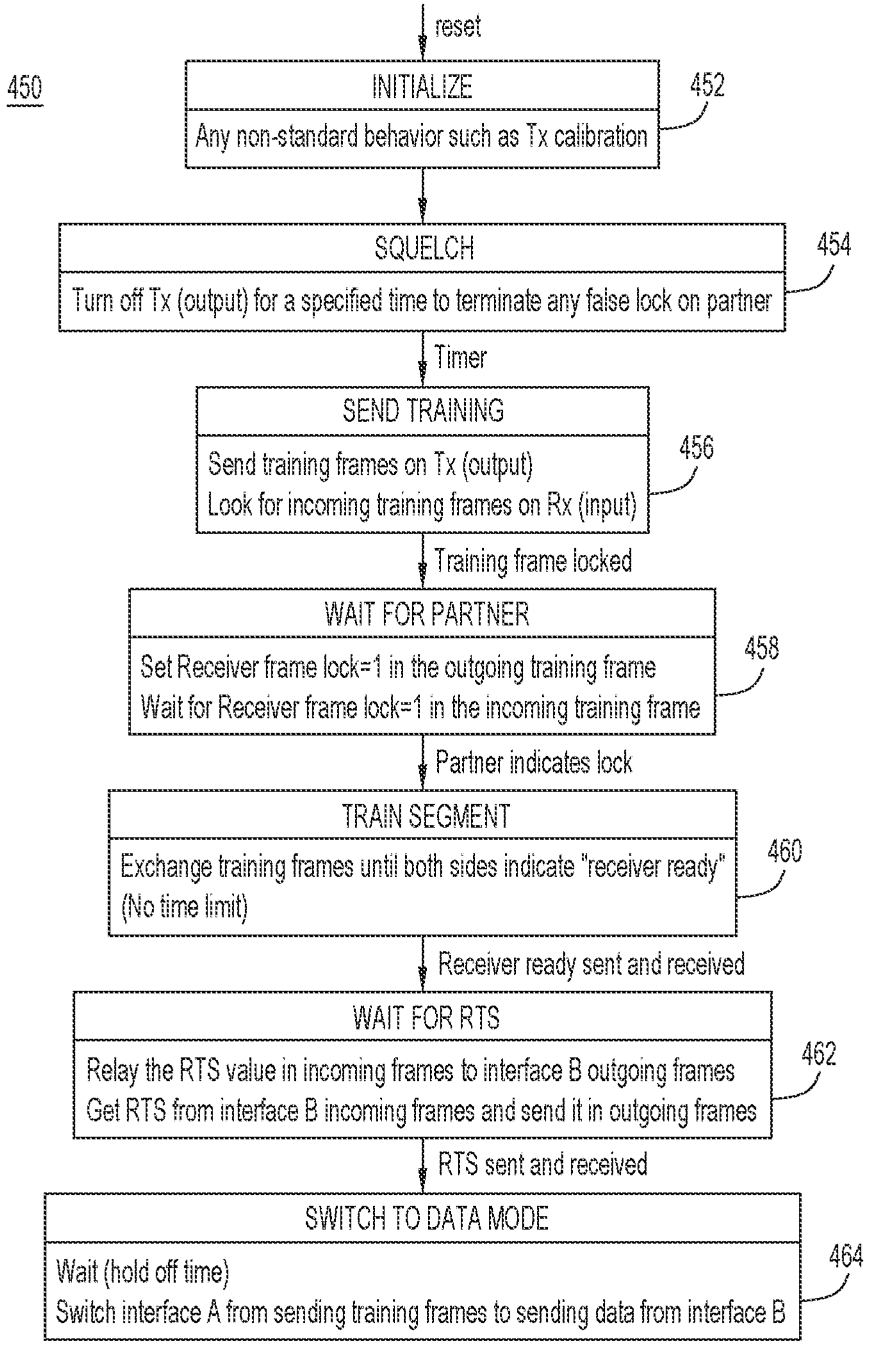
FIG. 4B is a flow chart depicting operation of the components depicted in FIG. 4A, according to an example embodiment.

Reference is now made to FIGS. 4A and 4B. FIG. 4A is a block diagram 400 of the relevant components to support link training on both sides (on both interfaces) for a retimer or module, for example. FIG. 4B is a flow chart that depicts the operations of the components on one of the interfaces. In FIG. 4A, there is a transmit function 410-A and receive function 412-A associated with Interface A, where the transmit function 410-A is coupled to an output 414-A to send signals or data to an adjacent segment and the receive function 412-A is coupled to an input 416-A to receive signals or data from an adjacent segment. For Interface A, there is a switch 420-A, a training frame (TF) generator 430-A, and a TF decoder 432-A. The switch 420-A is controlled to select either the output of the TF generator 430-A or the output of the receive function 412-B. The TF decoder 432-A is coupled to the output of the receive function 412-A to decode a received training frame.

Similarly, for Interface B, there is a transmit function 410-B and receive function 412-B, where the transmit function 410-B is coupled to an output 414-B to send signals or data to an adjacent segment and the receive function 412-B is coupled to an input 416-B to receive signals or data from an adjacent segment. For Interface B, there is a switch 420-B, a TF generator 430-B, and a TF decoder 432-B. The switch 420-B is controlled to select either the output of the TF generator 430-B or the output of the receive function 412-A. The TF decoder 432-B is coupled to the output of the receive function 412-B to decode a received training frame.

A training logic block 440 is coupled to the TF generator 430-A and TF decoder 432-A, and is coupled to the TF generator 430-B and TF decoder 432-B. The training logic block 440 generates a signal select control 442-A for switch 420-A and a signal select control 442-B for switch 420-B. The training logic block 440 also generates a squelch control signal 444-A that is coupled to the output 414-A and a squelch control signal 444-B that is coupled to the output 414-B. The training logic block 440 controls the TF generator 430-A to send training frames out on Interface A, and similarly controls the TF generator 430-B to send training frames out on Interface B. The training logic block 440 incorporates the handshake logic 230 of FIG. 2B and processes the RTS state obtained from received training frames that have been decoded by the TF decoder 432-A and TF decoder 432-B.

In the state diagram of FIG. 3, there are two aspects that a device can control on each interface. A first is that the device can go to a Quiet mode/state, which means to turn off the transmitter function on that interface. That corresponds to the squelch control generated by the training logic block 440. The other aspect that a device can control on each interface is what is sent-either a training frame or, when a switch is made to data mode, then data-whatever it received. That is the purpose of the switches 420-A and 420-B in FIG. 4A.

The TF generators, TF decoders and training logic shown in FIG. 4A may be implemented by digital logic gates configured to perform the associated functions. The transmit and receive functions perform standard Ethernet transmit and receive operations and may be performed by suitable analog or analog and digital hardware as is known in the art. The switches shown may be implemented in hardware, digital logic gates or software. The training logic may be part of other controller functions implemented by digital logic gates or a dedicated processor chip or central processing unit (CPU).

Reference is now made to FIG. 4B for a description of a flow chart 450 depicting the operations of the components in FIG. 4A for one of the interfaces, e.g., Interface A. FIG. 4B shows, in more detail, how device firmware can be implemented for compliance with the state diagram of FIG. 3, when both interfaces of the device use training as in FIG. 4A. The operations in connection with Interface B is are symmetrical. Step 452 involves an initialization that is triggered when any non-standard behavior or reset occurs, such as a transmitter calibration request. Next, step 454 involves a Squelch operation in which the transmitter output, e.g., output 414-A for transmitter function 410-A, for a specified time to terminate any false lock on a partner. After the time period expires for false lock, at step 456, the training logic block 440 controls the TF generator 430-A to generate training frames and controls the switch 420-A to select the output of the TF generator 430-A to the transmit function 410-A so that the training frames are sent out on Interface A. At the same time, the training logic block 440 will be looking for incoming training frames on Interface A that are received by receive function 412-A and decoded by the TF decoder 432-A.

At step 458, a wait for partner state is entered where the training logic block 440 sets a receiver frame lock parameter=1 (true) in the outgoing training frame, and waits for an incoming frame with receiver frame lock=1. When a received frame indicates receiver lock=1, then at step 460, a train segment state is entered during which both sides exchange training frames (on Interface A) until both sides indicate receiver ready (RR). When both sides indicate receiver ready, then at step 462, the RTS value in incoming training frames is relayed to Interface B in outgoing training frames, and the RTS value from Interface B incoming training frames is obtained and sent in outgoing training frames on Interface A. When it is determined that RTS is true on sent and received training frames on Interface A, then at 464, a switch is made to data mode where, after a hold off period of time, the training logic block 440 uses the signal select control 442-A to switch from sending training frames out via the transmit function 410-A to sending data out from Interface A that is received by receive function 412-B from Interface B. Likewise, the training logic block 440 uses the signal select control 442-B to switch from sending training frames out via the transmit function 410-B to sending data out from Interface B that is received by receive function 412-A from Interface A.

Thus, FIG. 4B depicts a method performed by a device that is part of a multi-segment network link, and the device has two network interfaces, each to an adjacent segment partner. Thus, the device is at a mid-point in the network link. The method comprises: on a first network interface facing a first segment partner, receiving incoming training frames from the first segment partner and transmitting outgoing training frames to the first segment partner; on a second network interface facing a second segment partner, receiving incoming training frames from the second segment partner and transmitting outgoing training frames to the second segment partner; first including a first ready-to-send indication, when the first ready-to-send indication is included in an incoming training frame received from the first segment partner, in an outgoing training frame to be sent to the second segment partner; and second including a second ready-to-send indication, when the second ready-to-send indication is included in an incoming training frame received from the second segment partner, in an outgoing training frame to be sent to the first segment partner.

As explained herein, the first ready-to-send indication indicates that the first segment partner has, on all lanes, valid data and is ready to send data to the device on the first network interface, and the second ready-to-send indication indicates that the second segment partner has, on all lanes, valid data and is ready to send data to the device on the second network interface.

This method may further include: determining when an incoming training frame received from the first segment partner includes an incoming receiver ready indication; and including an outgoing receiver ready indication in an outgoing training frame transmitted to the first segment partner, wherein the steps of first including and the second including are performed when the incoming receiver ready indication is detected in an incoming training frame and when the outgoing receiver ready indication is included in an outgoing training frame.

As explained above, the step of first including may involve including the first ready-to-send indication in an outgoing training frame to be sent to the second segment partner when the device has a receiver ready indication and a received incoming training frame from the first segment partner has a receiver ready indication of the first segment partner on all lanes and a received incoming training frame from the second segment partner has a receiver ready indication of the second segment partner on all lanes.

Likewise, the step of second including may involve including the second ready-to-send indication in an outgoing training frame to the first segment partner when the device has a receiver ready indication and a received incoming training frame from the first segment partner has a receiver ready indication of the first segment partner on all lanes and a received incoming training frame from the second segment partner has a receiver ready indication of the second segment partner on all lanes.

Further, the method may involve, when both the first ready-to-send indication and the second ready-to-send indication are received, after a period of time, switching the first network interface from transmitting outgoing training frames to transmitting data that is received from the second network interface, and switching the second network interface from transmitting outgoing training frames to transmitting data that is received from the first network interface.

In the scenario where the device that is part of the multi-segment network link is an end point (and thus has a single network interface connected to a segment partner), a different method is performed, as depicted in FIG. 2A and described above. The method involves: on a network interface facing a segment partner, receiving incoming training frames from the segment partner and transmitting outgoing training frames to the segment partner; and including a ready-to-send indication in an outgoing training frame to be sent to the segment partner, wherein the ready-to-send indication indicates that the device has, on all lanes of the network interface, valid data and is ready to send data on the network interface to the segment partner.

This method may further involve: determining when an incoming training frame received from the segment partner includes a receiver ready indication, wherein the step of including involves including the ready-to-send indication when the device has a receiver ready indication and a received incoming training frame from the segment partner has a receiver ready indication on all lanes.

This method may further involve, when both the ready-to-send indication is included and a received incoming training frame from the segment partner has a receiver ready indication, after a period of time, switching the network interface from transmitting outgoing training frames to transmitting data.

A device or apparatus that is configured with the components of FIG. 4A and performs the operations of FIG. 4B may comprise: a first network interface; a first transmitter and a first receiver associated with the first network interface; a second network interface; a second transmitter and a second receiver associated with the second network interface; a first training frame generator and a first training frame decoder associated with the first network interface; a second training frame generator and a second training frame decoder associated with the second network interface; and a controller coupled to the first training frame generator, the first training frame decoder, the second training frame generator and the second training frame decoder. The controller is configured to: cause the first training frame generator to transmit outgoing training frames to a first segment partner via the first network interface and obtain training frame content obtained by the first training frame decoder from incoming training frames received from the first segment partner; cause the second training frame generator to transmit outgoing training frames to a second segment partner via the second network interface and obtain training frame content obtained by the second training frame decoder from incoming training frames received from the second segment partner; when a first ready-to-send indication is determined to be included in an incoming training frame received from the first segment partner, cause the second training frame generator to include the first ready-to-send indication in an outgoing training frame to be sent to the second segment partner; and when a second ready-to-send indication is determined to be included in an incoming training frame received from the second segment partner, cause the first training frame generator to include the second ready-to-send indication in an outgoing training frame to be sent to the first segment partner.

Figure 5A:
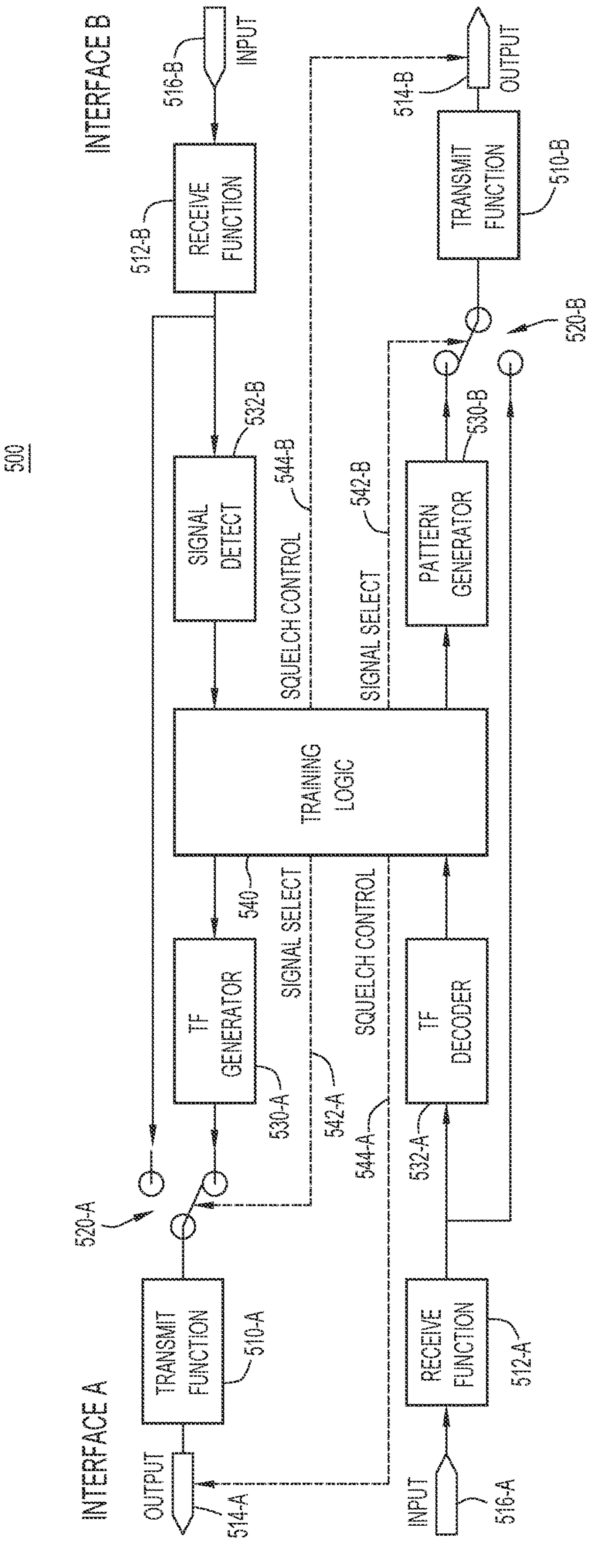
FIG. 5A is a block diagram of hardware components of a device configured to relay ready-to-send indications with a segment partner on only one network interface of the device, according to an example embodiment.
Figure 5B:
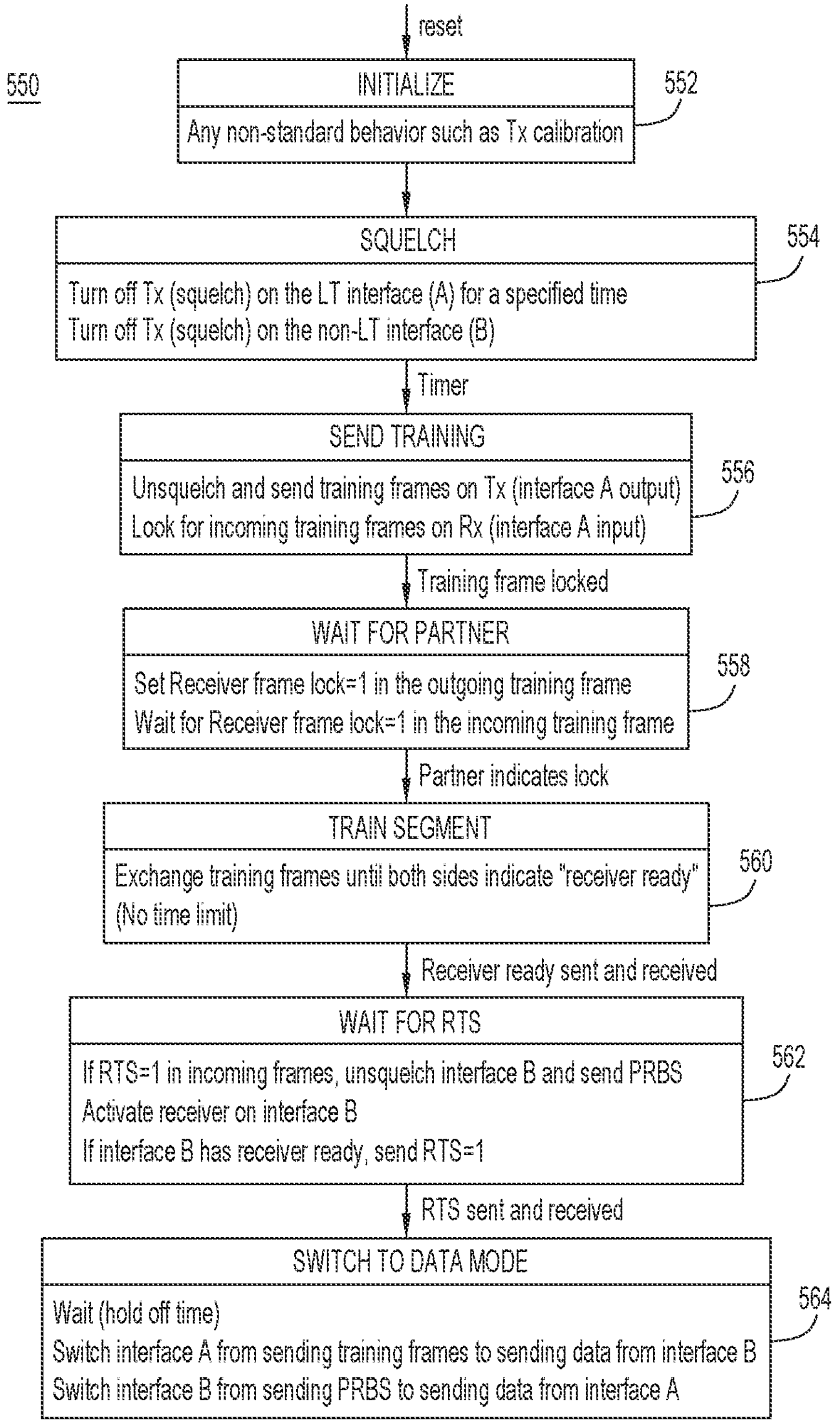
FIG. 5B is a flow chart depicting operation of the components depicted in FIG. 5A, according to an example embodiment.

Turning to FIGS. 5A and 5B, FIG. 5A is a block diagram 500 of the relevant components to support training on only one interface and FIG. 5B is a flow chart that depicts operations on both interfaces for the arrangement of FIG. 5A. FIG. 5A is similar to the arrangement of FIG. 4A, in many respects, but different in some respects. Training is supported on Interface A but not on Interface B, in this example. For example, Interface B can be connected to an existing/legacy segment that does not have segment training specified, or training may be disabled. Associated with Interface A are transmit function 510-A and receive function 512-A, where the transmit function 510-A is coupled to an output 514-A to send signals or data to an adjacent segment and the receive function 512-A is coupled to an input 516-A to receive signals or data from an adjacent segment. For Interface A, there is a switch 520-A, a training frame (TF) generator 530-A, and a TF decoder 532-A. The switch 520-A is controlled to select either the output of the TF generator 530-A or the output of the receive function 512-B. The TF decoder 532-A is coupled to the output of the receive function 512-A to decode a received training frame.

For Interface B, there is a transmit function 510-B and a receive function 512-B, an output 514-B to send outgoing frames or data, an input 516-B to receive incoming frames or data, a switch 520-B, a pseudorandom binary sequence (PRBS) generator 530-B (or some other binary pattern), and a signal detector block 532-B. The switch 520-B is controlled to select either the output of the PRBS generator 530-B or the output of the receive function 512-A.

A training logic block 540 is coupled to the TF generator 530-A and TF decoder 532-A, and is coupled to the PRBS generator 530-B and signal detect block 532-B. The training logic block 540 generates a signal select control 542-A for switch 520-A and a signal select control 542-B for switch 520-B. The training logic block 540 also generates a squelch control signal 544-A that is coupled to the output 514-A and a squelch control signal 544-B that is coupled to the output 514-B. The training logic block 540 controls the TF generator 530-A to send training frames out on Interface A, and similarly controls the PRBS generator 530-B to send a PRBS pattern out on Interface B. The training logic block 540 incorporates the handshake logic 230 of FIG. 2B.

If a valid signal is detected from the input 516-B on Interface B, this means that the receive function 512-B is ready, and it also means that the link partner is sending something that is data because there is no training from the partner connected to Interface B, so there is nothing else that link partner could be sending. It is transmitting data and waiting to receive data. When the signal detect block 532-B detects this, this means both Receiver Ready and Ready-to-Send are true. The training logic block 540 processes this accordingly.

If Interface A provides an RTS true, but there is no signal from Interface B, the training logic block 540 will not bring up the link, and instead it will control the PRBS generator 530-B to send a PRBS pattern out to the link partner since the link partner does not understand training frames. It is possible to replace the PRBS generator 530-B with a training frame generator. The link partner does not understand training frames, so it will just ignore the frames anyhow. The PRBS pattern is just a place holder sequence that notifies the link partner that there is something connected locally to Interface B that is ready to send.

The TF generator, TF decoder, signal detector, pattern generator and training logic shown in FIG. 5A may be implemented by digital logic gates configured to perform the associated functions. The transmit and receive functions perform standard Ethernet transmit and receive operations and may be performed by suitable analog or analog and digital hardware as is known in the art. The switches shown may be implemented in hardware, digital logic gates or software. The training logic may be part of other controller functions implemented by digital logic gates or a dedicated processor chip or central processing unit (CPU).

Reference is now made to FIG. 5B, with continued reference to FIG. 5A for a description of a flow chart 550 depicting operations of the arrangement shown in FIG. 5A. FIG. 5B shows, in more detail, how device firmware can be implemented for compliance with the state diagram of FIG. 3, when one interface of the device uses training as in FIG. 5A. Step 552 involves an initialization that is triggered when any non-standard behavior or reset occurs, such as a transmitter calibration request. Next, step 554 involves a squelch operation in the transmission of training frames out from Interface A, which is squelched for a period of time, and outgoing transmissions on Interface Bis are also squelched. In step 556, the training logic block 540 disables the squelch control signal to allow training frames to be sent out on Interface A, and looks for incoming training frames received by receive function 512-A on Interface A.

At step 558, a wait for partner state is entered where the training logic block 540 sets a receiver frame lock parameter=1 (true) in the outgoing training frame, and waits for an incoming training frame with receiver frame lock=1 on Interface A. When a received frame indicates receiver lock=1, then at step 560, a train segment state is entered during which both sides exchange training frames (on Interface A) until both sides indicate receiver ready (RR). When both sides indicate receiver ready, then at step 562, the training logic block 540 unsquelches the output of Interface B and controls the PRBS generator 530-B to send a PRBS pattern or other binary pattern (not necessarily a PRBS pattern) out on Interface B. The training logic block 540 also activates the receiver function 512-B on Interface B. If receiver ready state is discerned on Interface B (by the signal detect block 532-B detecting an incoming signal), then the training logic block 540 causes a RTS=1 to be sent out on Interface A.

When the training logic block 540 determines that RTS is true on both Interfaces (sent and received), then at step 564, the training logic block 540 switches to data mode. First, a hold off time is initiated, and when that expires, the training logic block 540 switches Interface A from sending out training frames to sending out data that is received on Interface B, and switches Interface B from sending a PRBS pattern to sending data received on Interface A.

Thus, FIG. 5B depicts a method performed by a device that is part of a multi-segment network link, has two network interfaces connected in the network link, one of the two network interfaces is connected to a segment partner that is segment-based link training capable and the other of the two network interfaces is connected to a segment partner that is not segment-based link training capable. The method involves: disabling a first transmitter on a first network interface of the device for a period of time; disabling a second transmitter on a second network interface of the device; on a first network interface facing a first segment partner, receiving incoming training frames from the first segment partner; after the period of time, enabling the first transmitter on the first network interface and transmitting outgoing training frames to the first segment partner; when a first ready-to-send indication is included in an incoming training frame received from the first segment partner, enabling the second transmitter and transmitting a binary pattern from a second network interface to a second segment partner; and when a receiver ready indication is determined for the second segment partner, including a second ready-to-send indication in an outgoing training frame transmitted to the first segment partner.

In this method, the first ready-to-send indication indicates that the first segment partner has, on all lanes, valid data and is ready to send data to the device on the first network interface, wherein the second ready-to-send indication indicates that the second segment partner has, on all lanes, valid data, and is ready to send data to the device on the second network interface.

This method may further involve: when the first ready-to-send indication is received and the second ready-to-send indication is included in an outgoing training frame to the first segment partner, after a period of time, switching the first network interface from transmitting outgoing training frames to transmitting data that is received from the second network interface, and switching the second network interface from transmitting the binary pattern to transmitting data that is received from the first network interface.

Moreover, the binary pattern may be a pseudorandom binary sequence.

A device or apparatus that is configured with the components of FIG. 5A and performs the operations of FIG. 5B may comprise: a first network interface; a first transmitter and a first receiver associated with the first network interface; a second network interface; a second transmitter and a second receiver associated with the second network interface; a training frame generator and a training frame decoder associated with the first network interface; a binary pattern generator and a signal detector associated with the second network interface; and a controller coupled to the training frame generator, the training frame decoder, the binary pattern generator and the signal detector. The controller is configured to: disable the first transmitter on the first network interface for a period of time; disable the second transmitter on the second network interface; cause the training frame generator to obtain training frame content obtained by the training frame decoder from incoming training frames received from a first segment partner; after the period of time, enable the first transmitter on the first network interface and cause the training frame generator to transmit outgoing training frames to the first segment partner; when a first ready-to-send indication is determined to be included in an incoming training frame received from the first segment partner, enable the second transmitter and cause the binary pattern generator to generate a binary pattern to be transmitted via the second network interface to a second segment partner; and cause the training frame generator to include a second ready-to-send indication in an outgoing training frame to be transmitted to the first segment partner when a receiver ready indication is determined for the second segment partner based on an output from the signal detector.

Figure 6A:
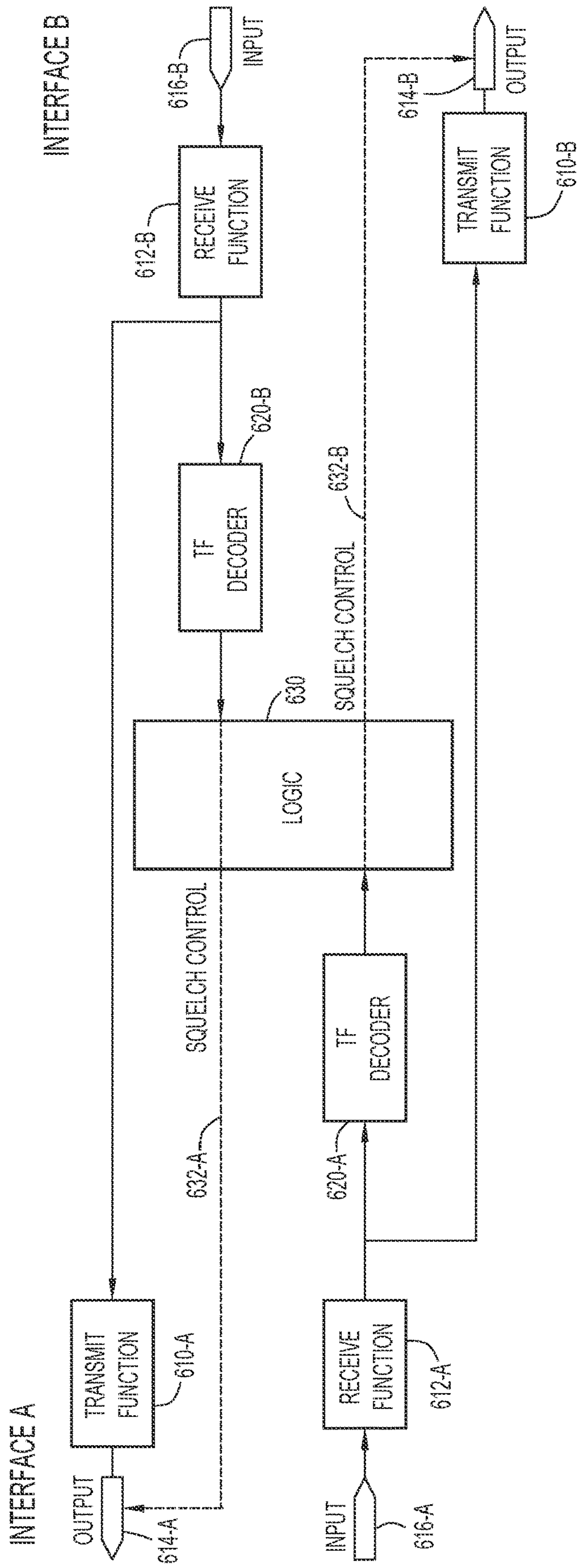
FIG. 6A is a diagram of hardware components of a device that has no training capabilities, according to an example embodiment.
Figure 6B:
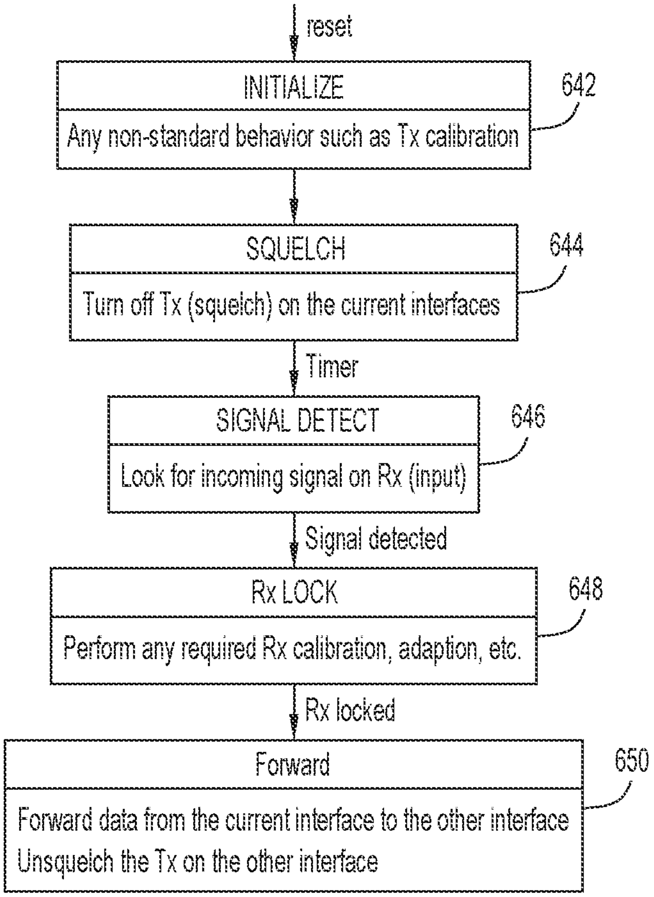
FIG. 6B is a flow chart depicting operation of the components depicted in FIG. 6A, according to an example embodiment.

Reference is now made to FIGS. 6A and 6B. These figures are provided to address a scenario where both sides are not segment-based link training capable. FIG. 6A shows a block diagram 600 of the components to pass signals from one interface to another interface, without any processing, since there are no training frames being transmitted/received. Associated with Interface A is a transmit function 610-A and a receive function 612-A. Transmit function 610-A sends signals out via the output 614-A and receive function 612-A receives inbound signals at input 616-A. There is a signal detect block 620-A coupled to the output of the receive function 612-A. Similarly, associated with Interface B is a transmit function 610-B and a receive function 612-B. Transmit function 610-B sends signals out via the output 614-B and receive function 612-B receives inbound signals at input 616-B. There is a signal detect block 620-B coupled to the output of the receive function 612-B. Logic block 630 receives as input the outputs of the signal detect blocks 620-A and 620-B and generates a squelch control 632-A to output 614-A and a squelch control 632-B to output 614-B.

The signal detector and logic shown in FIG. 6A may be implemented by digital logic gates configured to perform the associated functions. The transmit and receive functions perform standard Ethernet transmit and receive operations and may be performed by suitable analog or analog and digital hardware as is known in the art. The switches shown may be implemented in hardware, digital logic gates or software.

Operation of the arrangement of FIG. 6A is now described with respect to the flow chart 640 in FIG. 6B. FIG. 6B shows, in more detail, how device firmware can be implemented for compliance with the state diagram of FIG. 3, when both interfaces of the device do not use training as in FIG. 6A. Step 642 involves an initialization that is triggered when any non-standard behavior or reset occurs, such as a transmitter calibration request. At step 644, the logic block 630 provides a squelch control to the outputs associated with both interfaces to squelch any transmissions out of both Interfaces. At step 646, a signal detect operation is performed where the logic block 630 looks for outputs from the signal detect blocks 620-A and 620-B to provide an output indicating an incoming/received signal on either interface. If a signal is detected on either interface, then at step 648, a receiver lock operation whereby a receive function calibration or adjustment is performed to ensure adequate receiver lock to the incoming signal. After the receive function is calibrated, then at step 650, the logic block 630 unsquelches the output on the other interface so that data can be forwarded from the interface where the data was received to be transmitted out of the other interface.

Reference is now made to FIG. 7. FIG. 7 shows that the RTS information may be included within a training frame defined by IEEE 802.3, Clause 136, Table 162-10 ("Status Field Structure") in a reserved bit position 6 of the status field structure of a training frame. The field would be named "Extend training" and a logical "1" would be transmitted to indicate that training is to continue (RTS=0) and a logical "0" would be transmitted to indicate training is completed (RTS=1) and thus switch can be made to data. In other words, bit 6 is the logical inverse of the RTS value.

Thus, in the methods presented above, the ready-to-send indication may be a single bit that is included in a bit of a status field of a training frame, where a first state of the single bit indicates that no data is available and training is to continue and a second state of the single bit indicates to switch to data mode when training is complete.

Figure 8A:
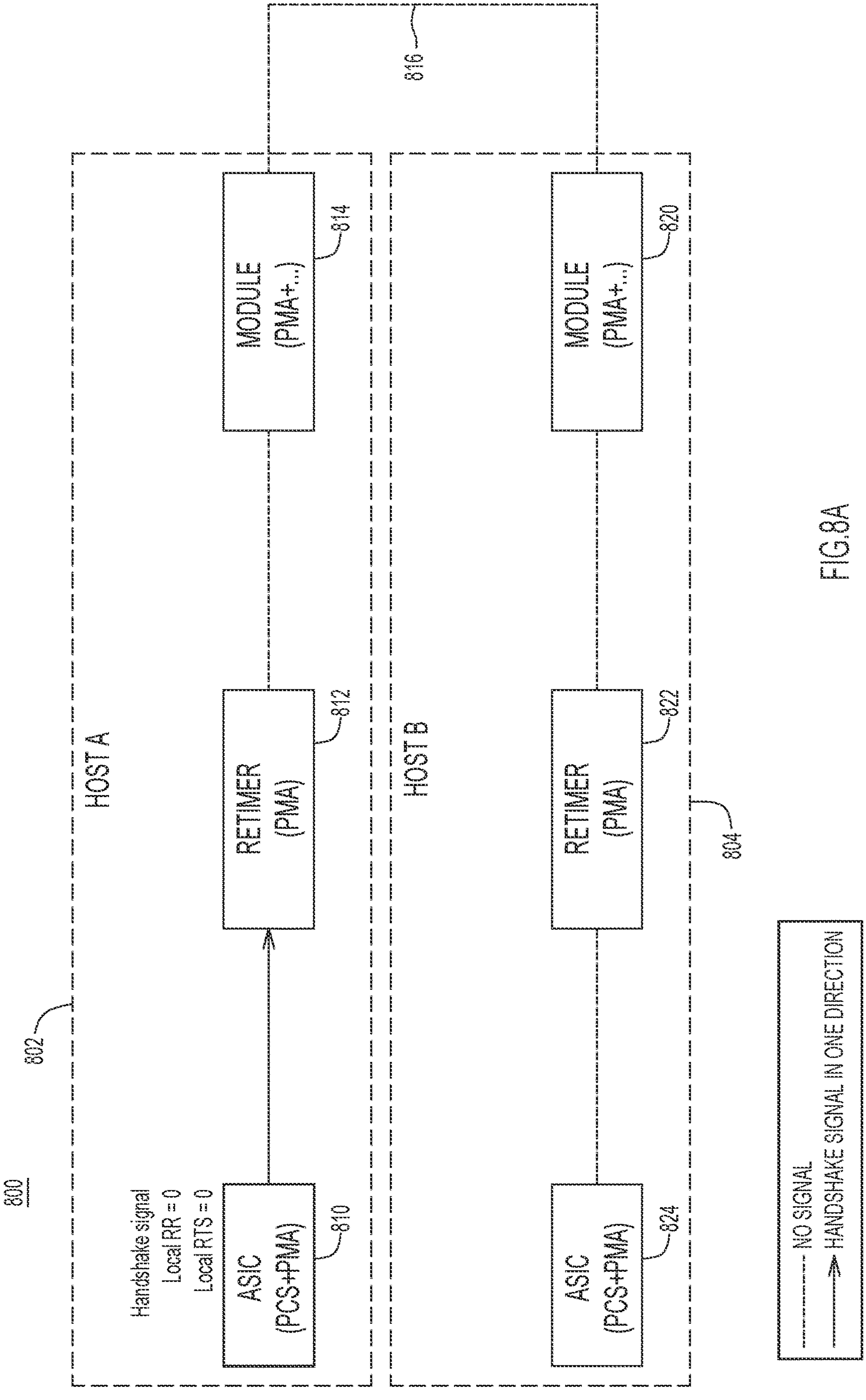
FIGS. 8A-8K illustrate a multi-segment link example in which handshaking techniques presented are used to propagate ready-to-send indication information among the segments, according to an example embodiment.

Turning now to FIGS. 8A-8K, a series of diagrams are provided that step through a multi-segment link-up example where handshaking is used on all segments. That is, the scenario of FIGS. 8A-8K assumes that the PMD sublayer and all AUIs are configured to perform the handshake signaling described above in connection with FIGS. 2, 3, 4A and 4B (there are no "legacy" interfaces). This is meant to be an example, and it should be understood that the number of AUIs can be different. Moreover, the order of power-up and training is arbitrary. Referring first to FIG. 8A, the example system 800 involves Host A at reference numeral 802 and Host B at reference numeral 804. Host A has an ASIC 810 that performs PCS and PMA sublayer functions, a retimer 812 that performs PMA sublayer functions and a module 814 that performs PMA sublayer and other functions. The module 814 sends to, and receives from, signals and data over a physical media (e.g., an optical fiber) 816 to Host B. Host B includes a module 820, retimer 822 and ASIC 824. There are 5 segments in this arrangement: a first segment between the ASIC 810 and the retimer 812; a second segment between the retimer 812 and the module 814; a third segment between the module 814 and the module 820; a fourth segment between the module 820 and the retimer 822 and a fifth segment between the retimer 822 and the ASIC 824. The segment training can occur in any order and on multiple segments. The state of the system 800 in FIG. 8A is such that the link is down between Host A and Host B, and initially only the ASIC 810 in Host A is active. All segments are down. The values of Local RR and Local RTS are indicated in FIG. 8A.

Figure 8B:
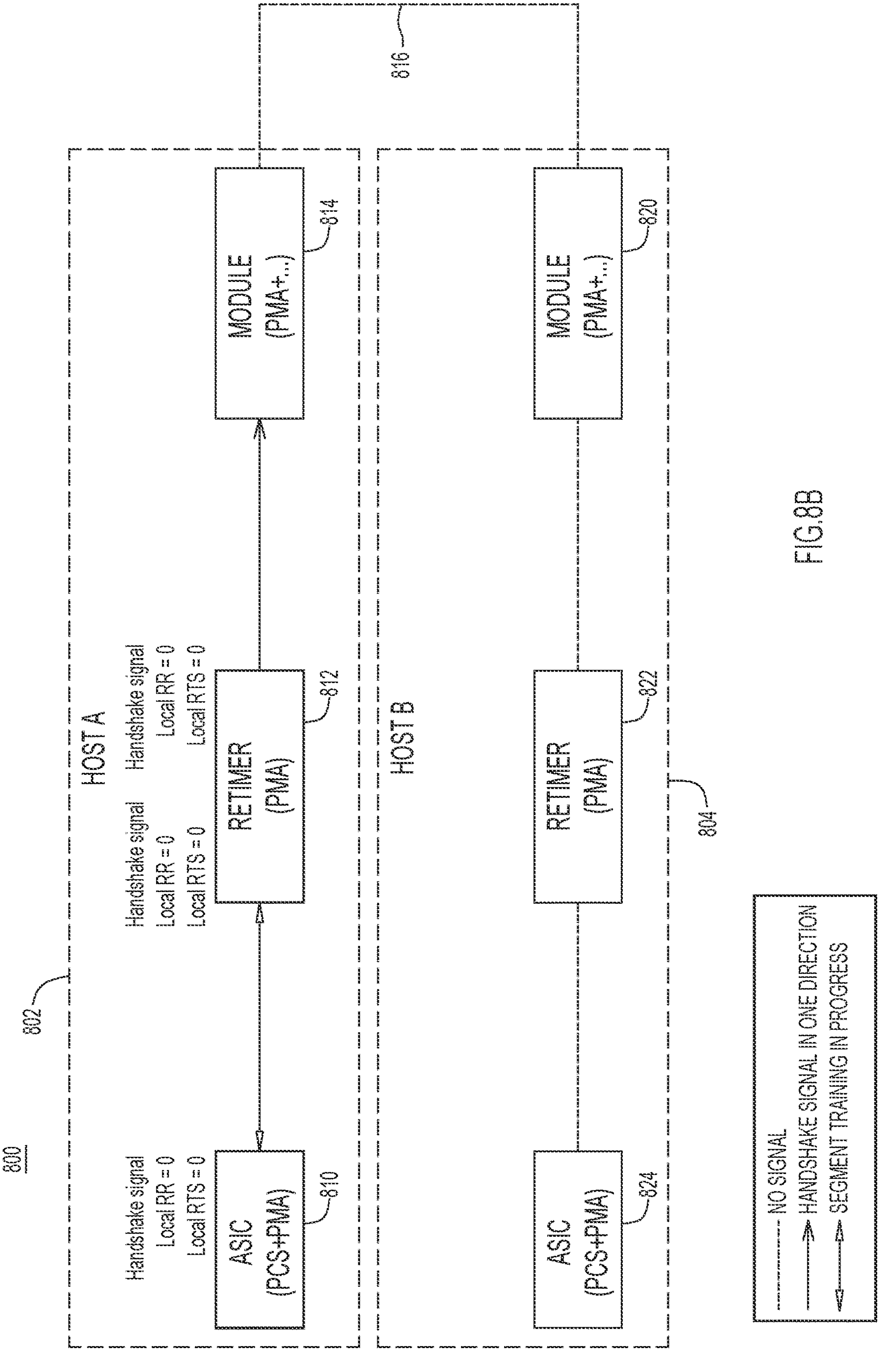

In FIG. 8B, the retimer 812 is activated and starts a handshake with its segment partners (ASIC 810 and module 814). The module 814 is still inactive, and the link is still down between Host A and Host B. The values for Local RR and Local RTS on the interfaces of the retimer 812 are all 0's at this point. The ASIC 810 has not yet passed its Local RTS value to retimer 812. However, segment training is in process between the ASIC 810 and the retimer 812, and the retimer 812 initiates handshake towards the module 814.

Figure 8C:
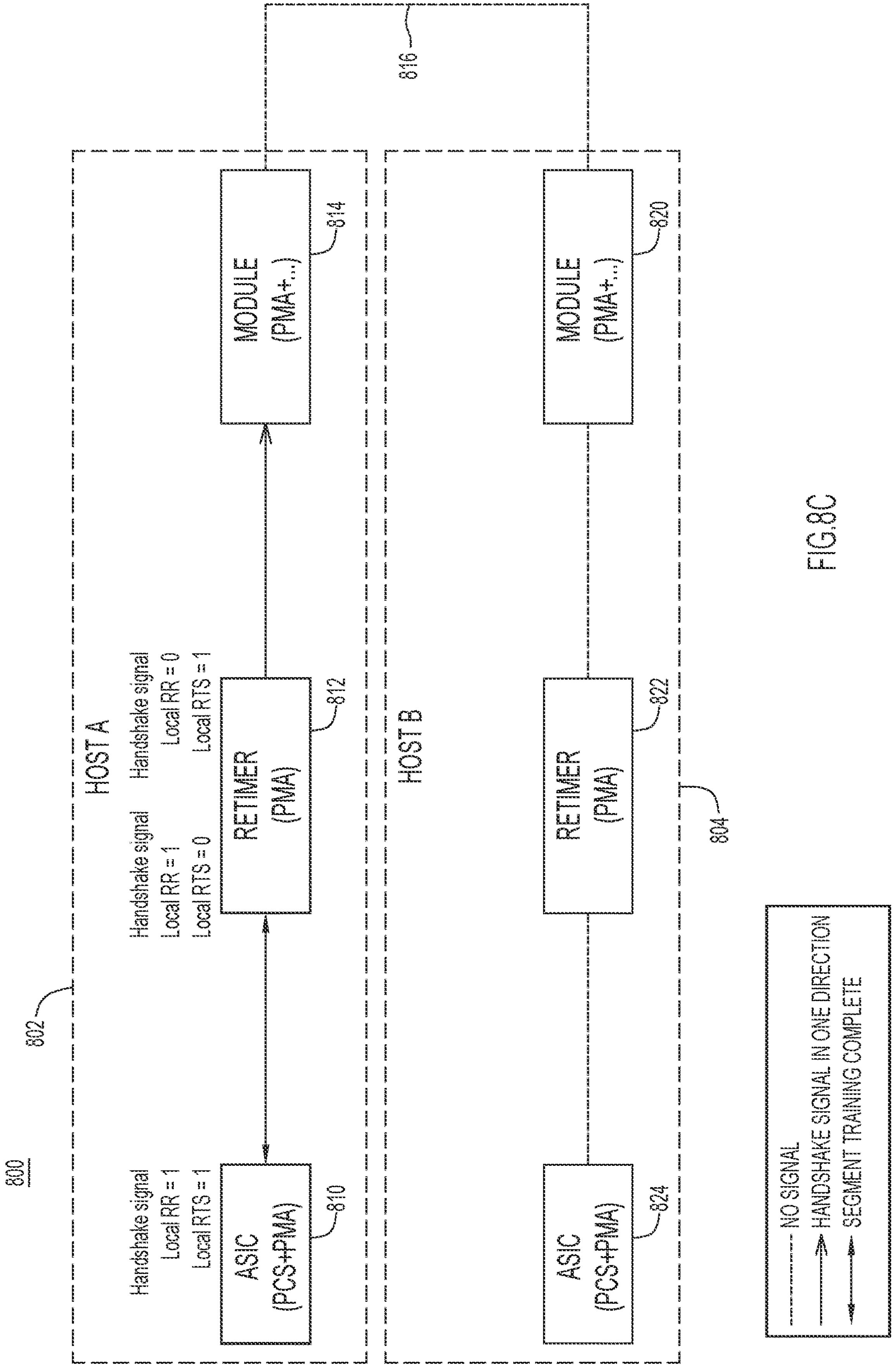

In FIG. 8C, the handshake between the ASIC 810 and the retimer 812 is successful. The Local RTS value of "1" on the interface of the ASIC 810 to the retimer 812 is propagated towards Host B, but the Local RTS value on the interface of the retimer 812 to the ASIC 810 is still false, so handshake signaling continues. The link is still down between Host A and Host B.

Figure 8D:
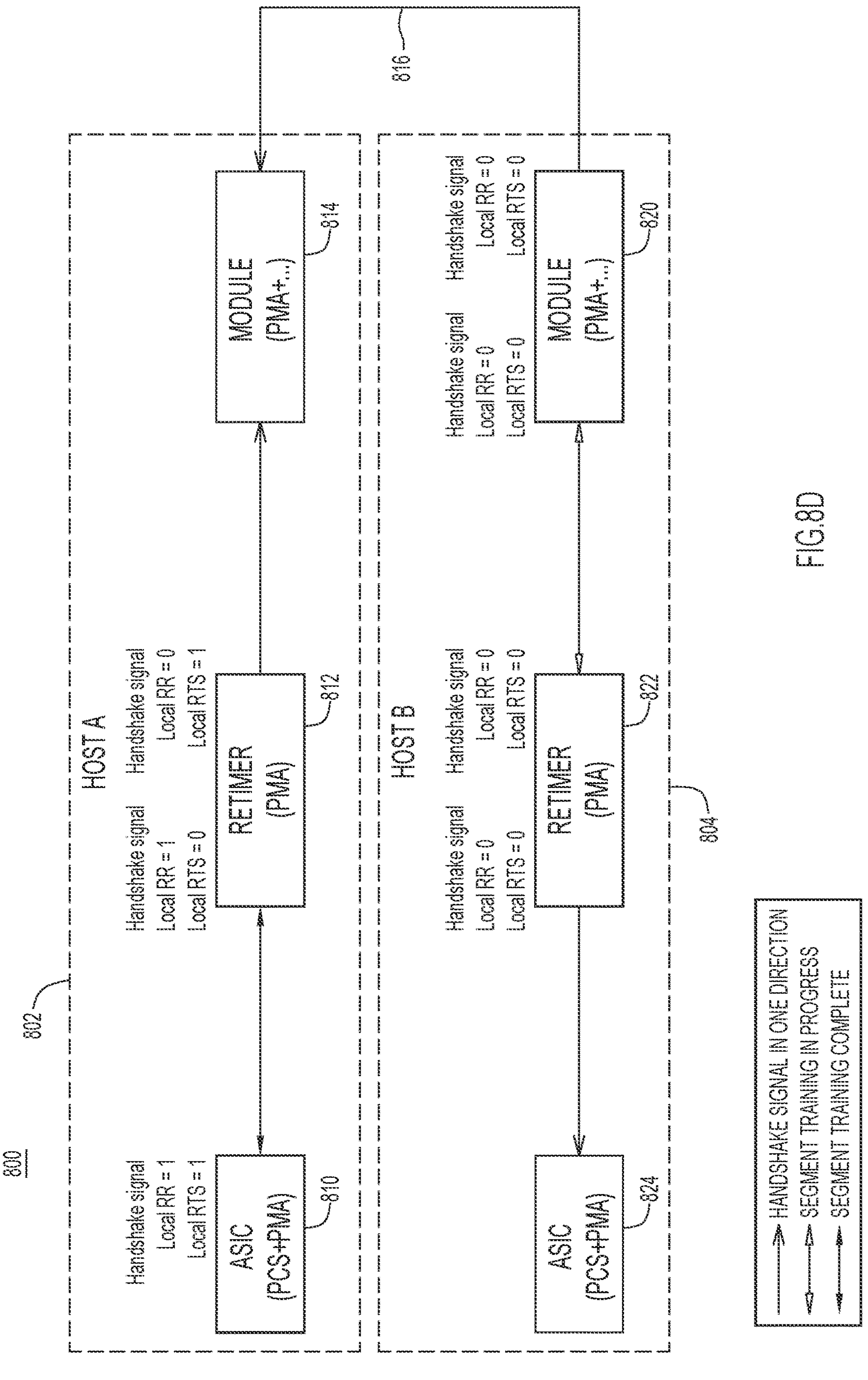

FIG. 8D shows that the module 820 and the retimer 822 in Host B are activated and start the handshake using local clocks and engage in segment training between them. The retimer 822 also initiates handshake towards the ASIC 824. The values of Local RR and Local RTS on the interfaces of the module 820 and the retimer 822 are all still "0" at this point. The link is still down between Host A and Host B.

Figure 8E:
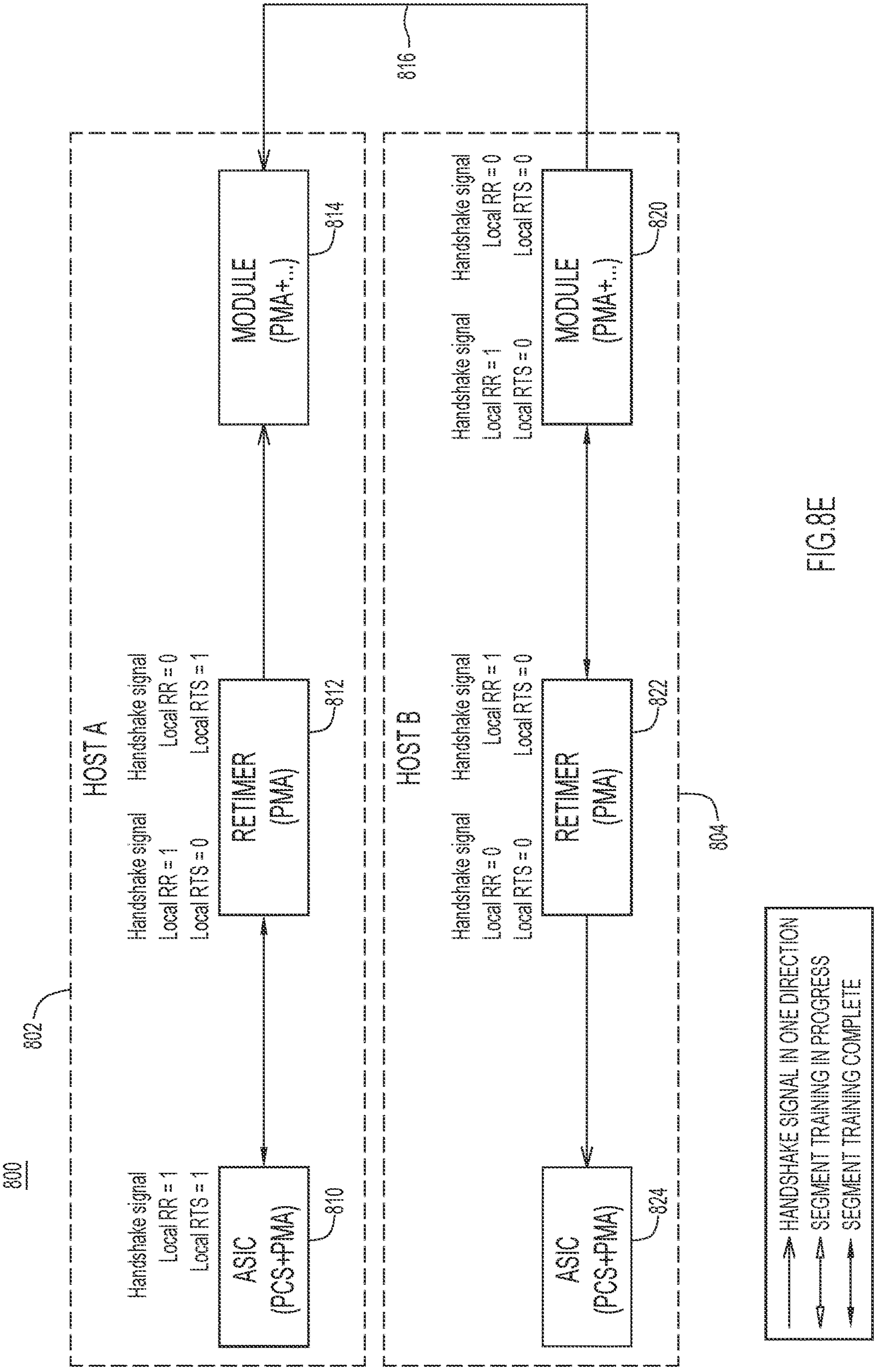

FIG. 8E shows that the handshake between the module 820 and the retimer 822 is successful, but there is no RTS=1 value in either direction so handshake signaling continues. The link is still down between Host A and Host B.

Figure 8F:
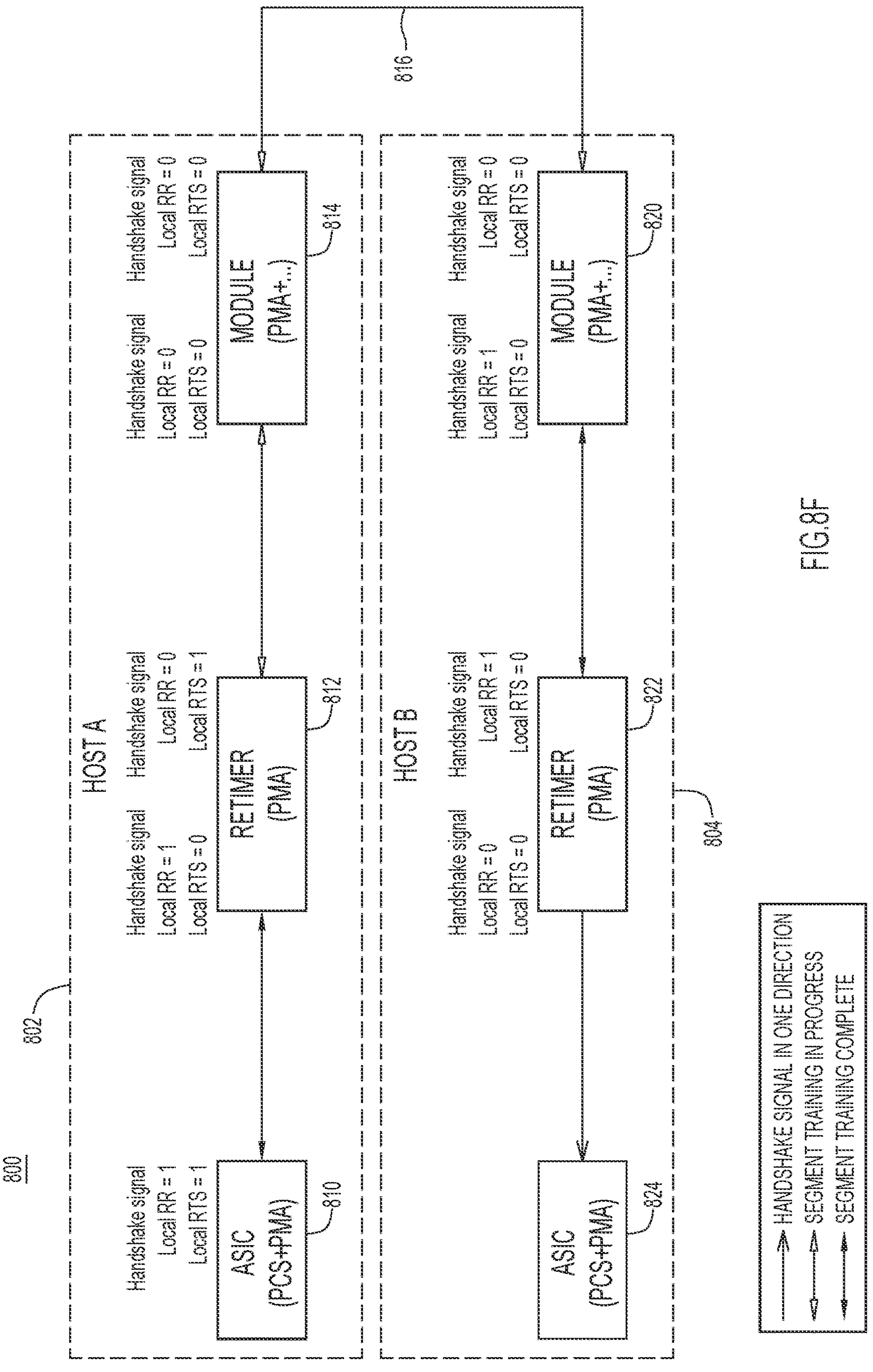

FIG. 8F shows that the module 814 of Host A is activated and starts handshake with the retimer 812 and with module 820 of Host B. Recovered clocks are used in both directions. The link is still down between Host A and Host B.

Figure 8G:
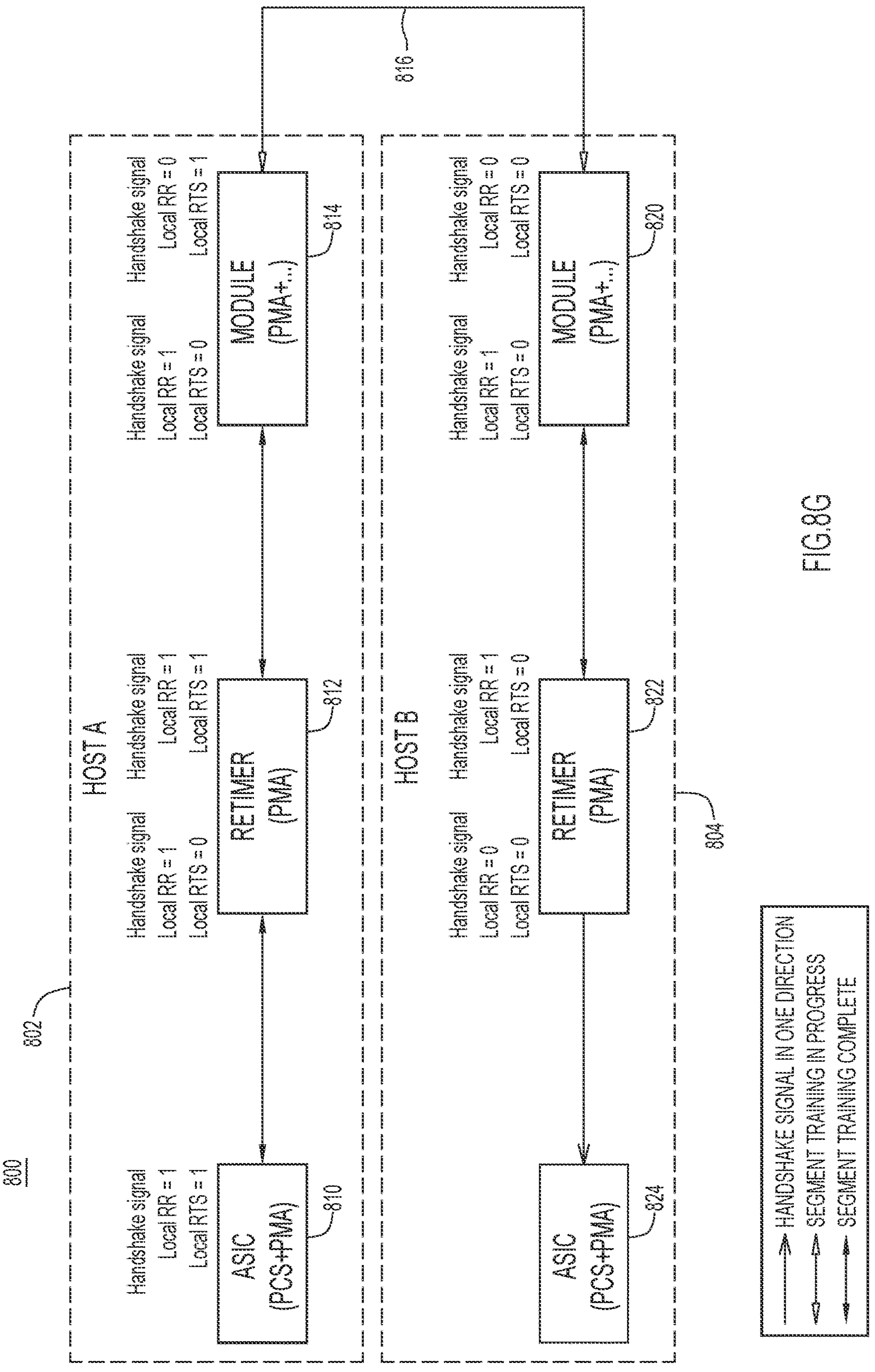

In FIG. 8G, the handshake between the retimer 812 and module 814 is successful. The RTS is propagated towards Host B, as is evidenced by Local RTS=1 on the interface of the module 814 to the module 820. The handshake/segment training between module 814 and module 820 continues. The link is still down between Host A and Host B.

Figure 8H:
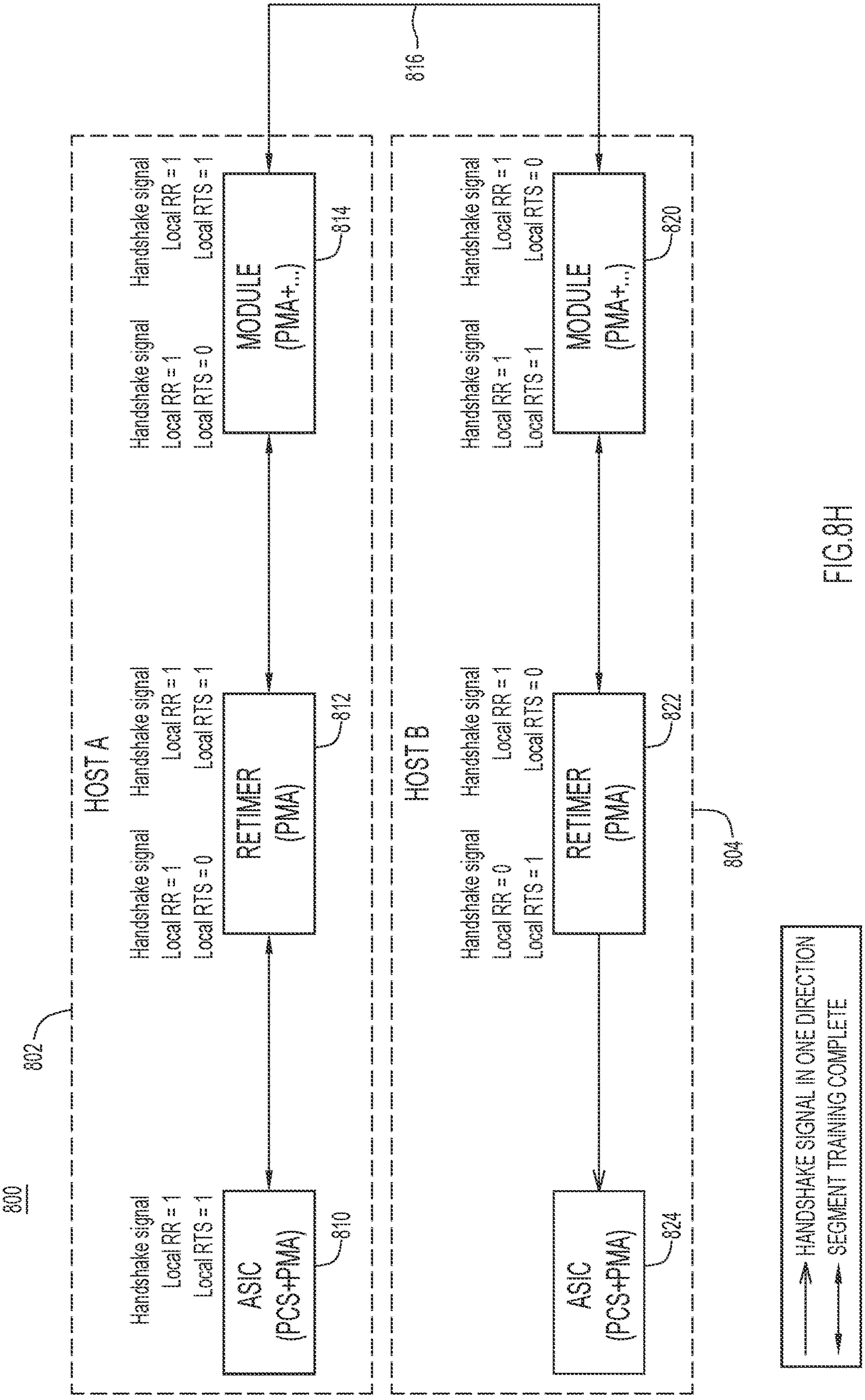

In FIG. 8H, the handshake between module 814 and module 820 is successful. The RTS=1 is propagated towards the ASIC 824 as shown by the Local RTS=1 on the interface of the module 820 to the retimer 822. However, as between the module 820 and the retimer 822, RTS is not true in both directions. On that segment, Local RTS is sent as 1 from the module 820, but Local RTS is sent as 0 from the retimer 822. Therefore, the handshake (training) signaling continues. The link is still down between Host A and Host B.

Figure 8I:
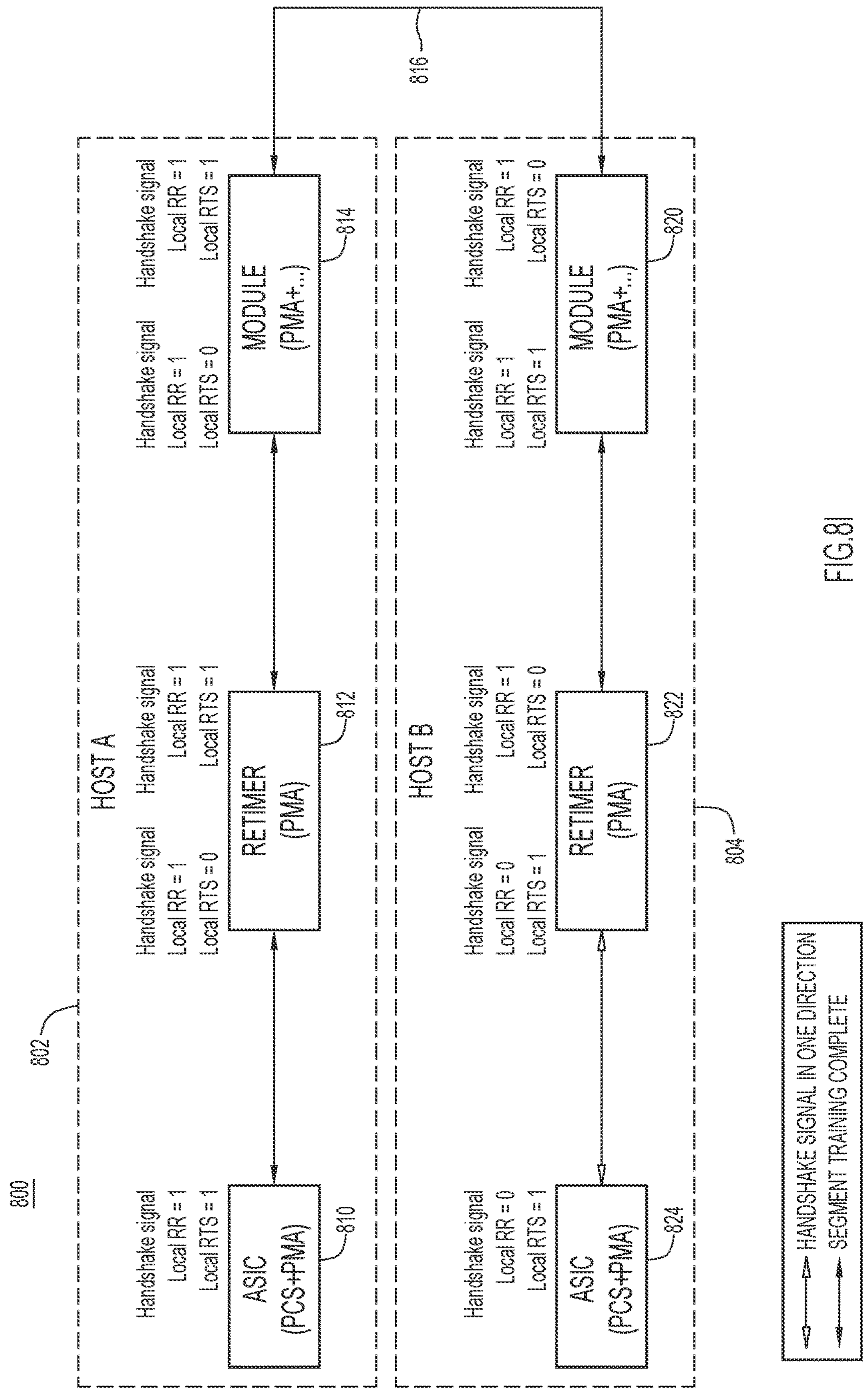

In FIG. 8I, the ASIC 824 in Host B is activated and starts handshake with the retimer 822. The link is still down between Host A and Host B.

Figure 8J:
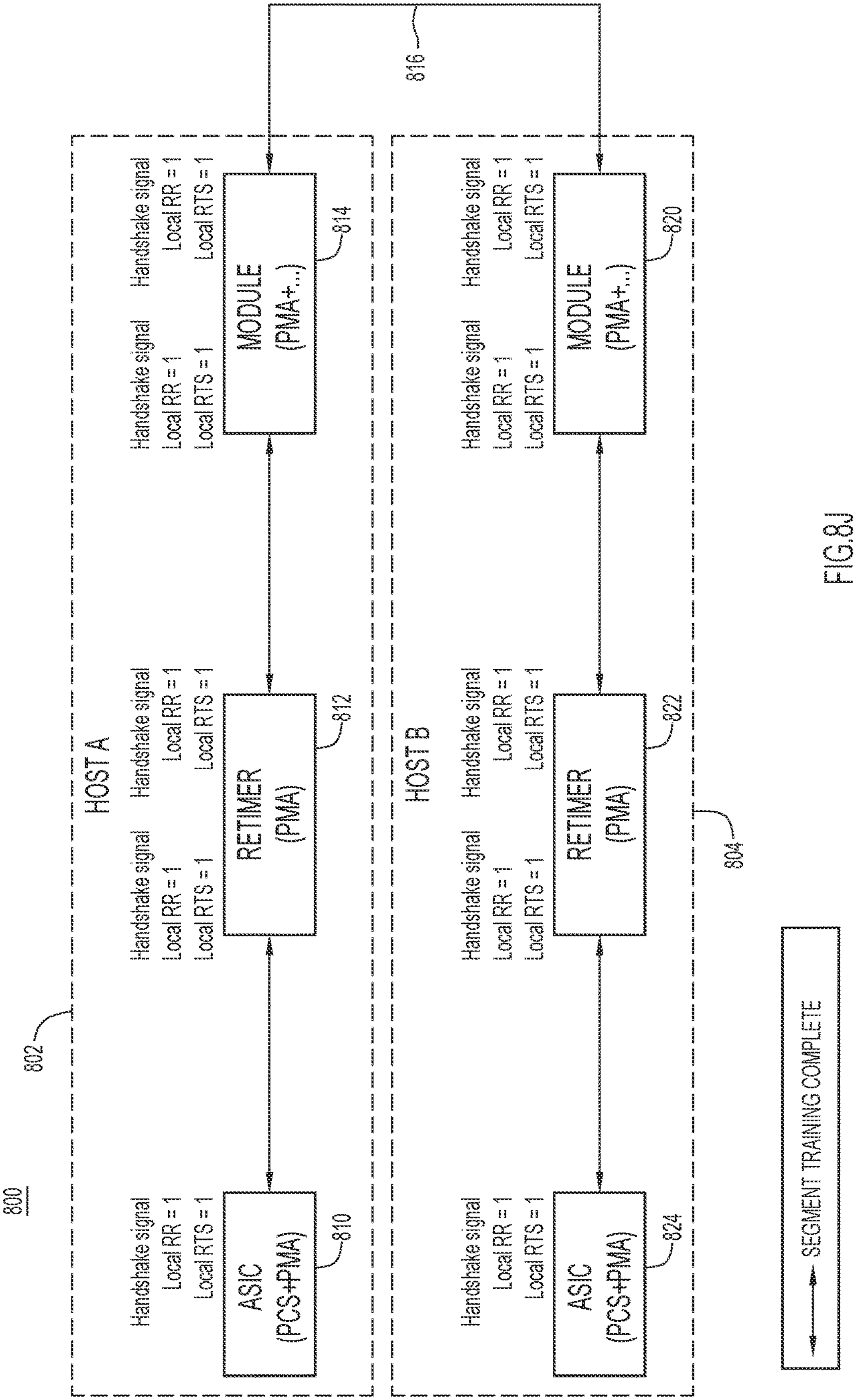

In FIG. 8J, the ASIC 824 and retimer 822 complete handshake successfully. RTS is propagated in both directions. Local RTS=1 on the interface of the retimer 822 towards the module 820 and Local RTS=1 as well as on the interface of the retimer 822 towards the ASIC 824. RTS=1 flows right to left and left to right, and eventually, all the devices send Local RTS=1 and receive Remote RTS=1 on both sides/interfaces (if the device has two interfaces involved). The link is still down between Host A and Host B.

Figure 8K:
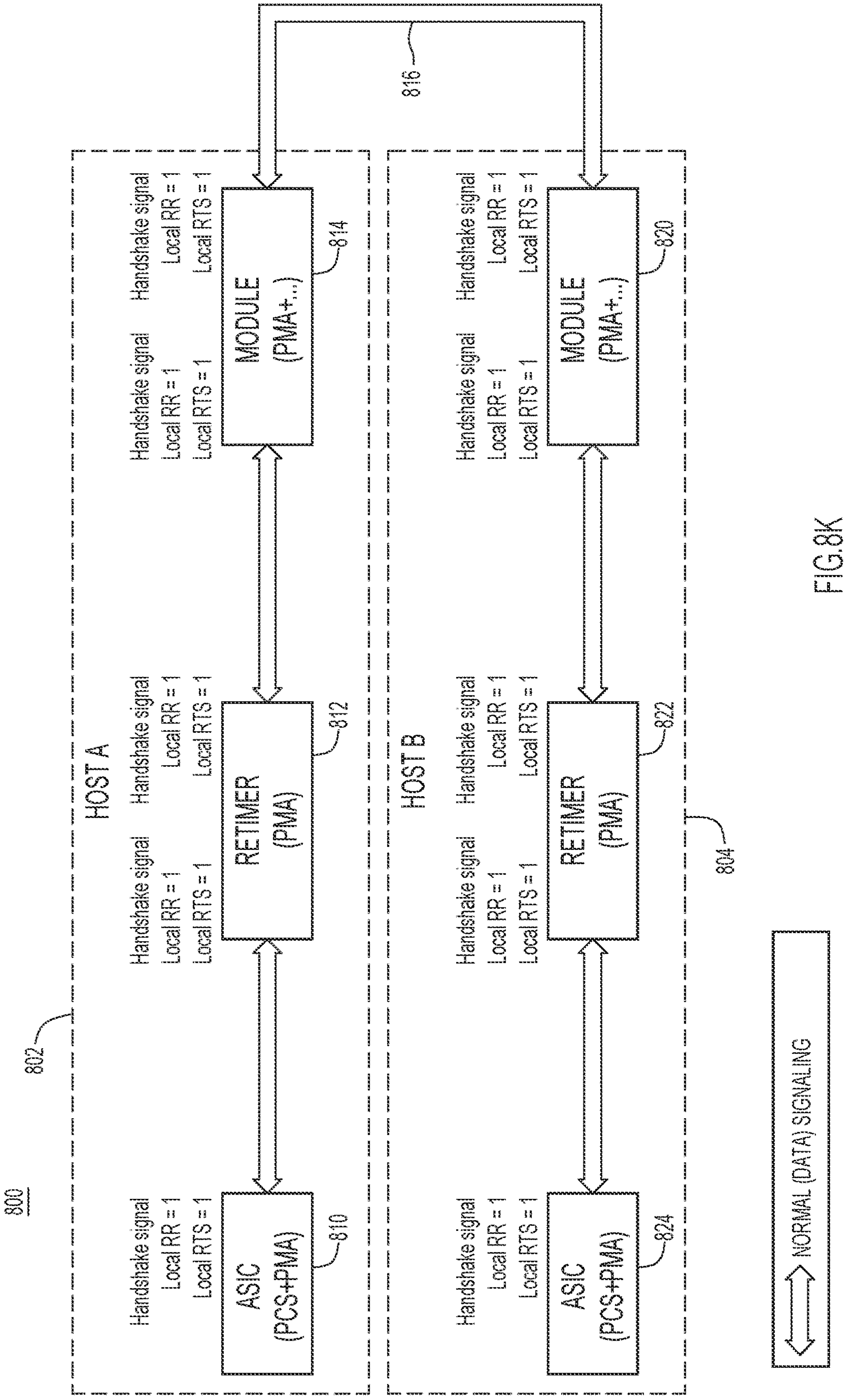

In FIG. 8K, after a delay, each PMA stops handshake signaling and switches to data mode in both directions. The link is up between Host A and Host B. At this point, data can be sent between Host A and Host B. Until this point, only training frames were being sent, and they were continuing to be sent to keep the link up, even though there is no data to be sent. Once the switch is made to data mode, data is sent from the ASIC to the retimer, and from the retimer to the Module, etc.

Figure 9A:
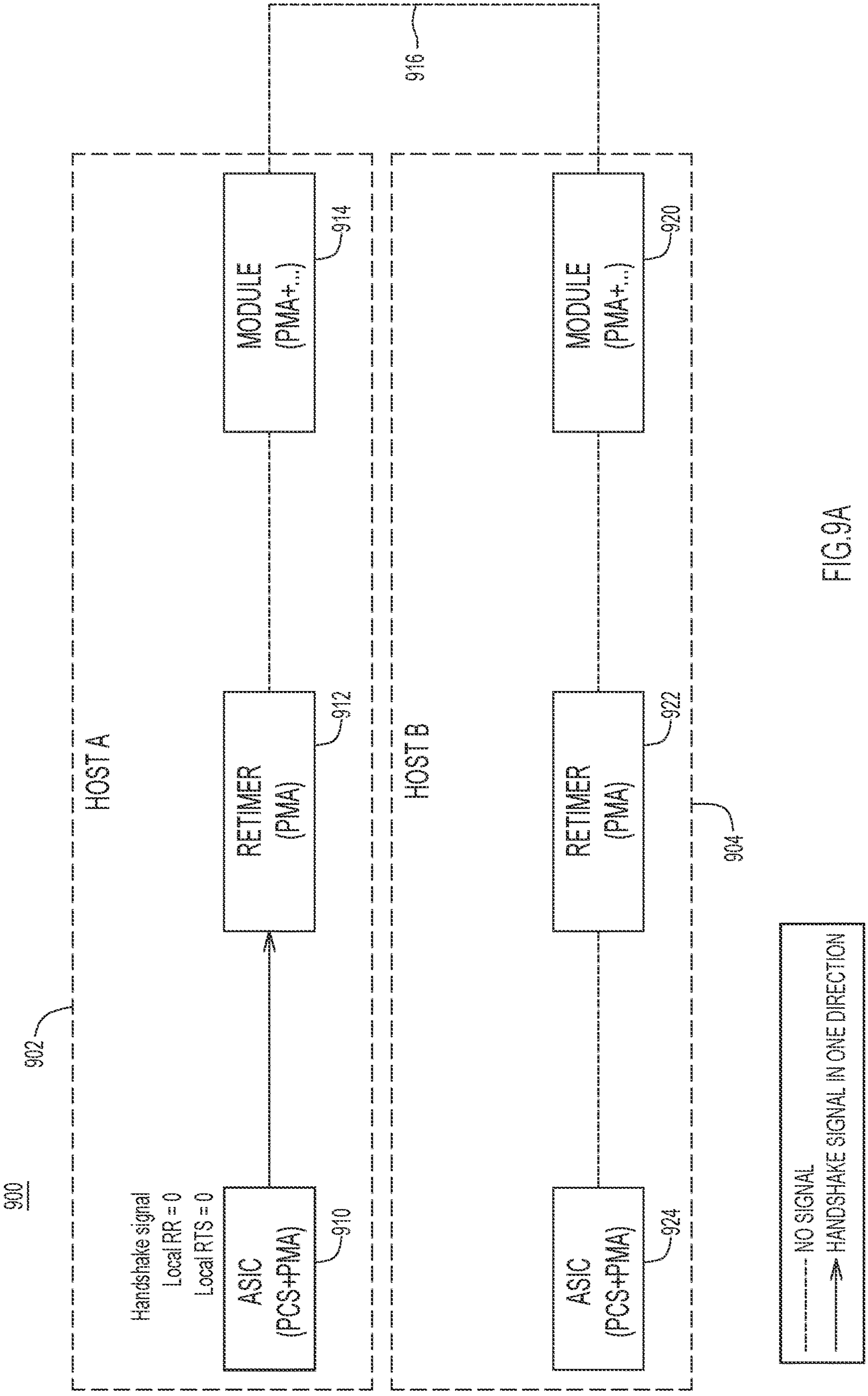
FIGS. 9A-9L illustrate a multi-segment link example in which some elements of the link are not configured to perform the handshaking techniques, according to an example embodiment.

FIGS. 9A-9L illustrate a system 900 in which the PMDs and some AUIs do not perform handshake signaling. For example, 100 Gb/s per lane AUIs and a PMD type do not support the handshake. Signal detect and squelching are used instead for these components, as depicted in FIGS. 5A and 5B. Like FIGS. 8A-8K, these figures are meant to be an example, and it should be understood that the number of AUIs can be different. Moreover, the order of power-up and training is arbitrary. The example system 900 involves Host A at reference numeral 902 and Host B at reference numeral 904. Host A has an ASIC 910 that performs PCS and PMA sublayer functions, a retimer 912 that performs PMA sublayer functions and a module 914 that performs PMA sublayer and other functions. The module 914 sends to, and receives from, signals and data over a physical media (e.g., an optical fiber) 916 Host B. Host B includes a module 920, retimer 922 and ASIC 924. There are 5 segments in this arrangement: a first segment between the ASIC 910 and the retimer 912; a second segment between the retimer 912 and the module 914; a third segment between the module 914 and the module 920; a fourth segment between the module 920 and the retimer 922 and a fifth segment between the retimer 922 and the ASIC 924. The segment training can occur in any order. The state of the system 900 in FIG. 9A is such that the link is down between Host A and Host B, and initially only the ASIC 910 in Host A is active. All segments are down. The values of Local RR and Local RTS are indicated in FIG. 9A. Host B does not do segment training like Host A does.

Figure 9B:
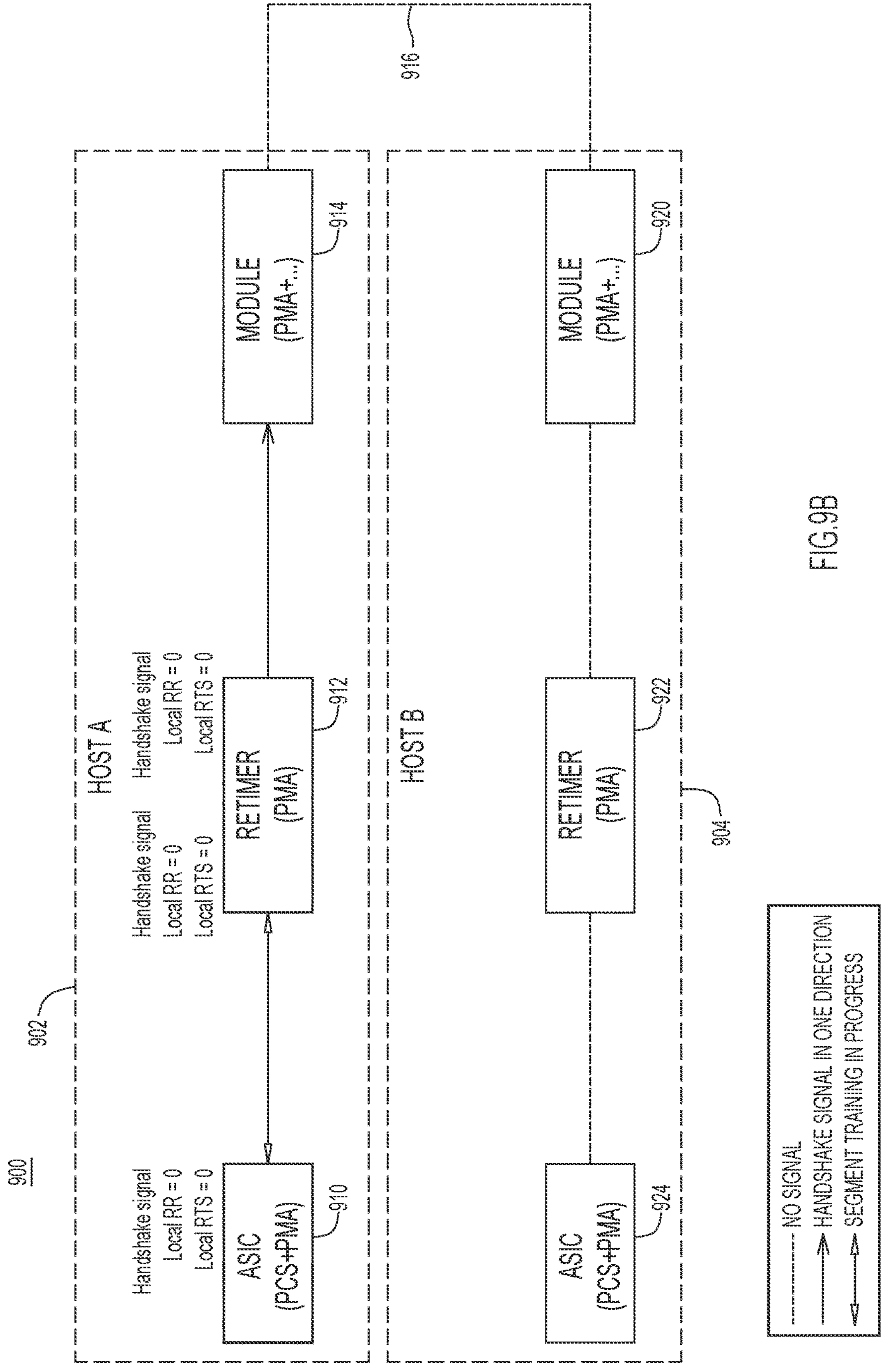

In FIG. 9B, the retimer 912 is activated and starts a handshake with its segment partners (ASIC 910 and module 914). The module 914 is still inactive, and the link is still down between Host A and Host B. The values for Local RR and Local RTS on the interfaces of the retimer 912 are all 0's at this point. The ASIC 910 has not yet passed its Local RTS value to retimer 912. However, segment training is in process between the ASIC 910 and the retimer 912, and the retimer 912 initiates handshake towards the module 914.

Figure 9C:
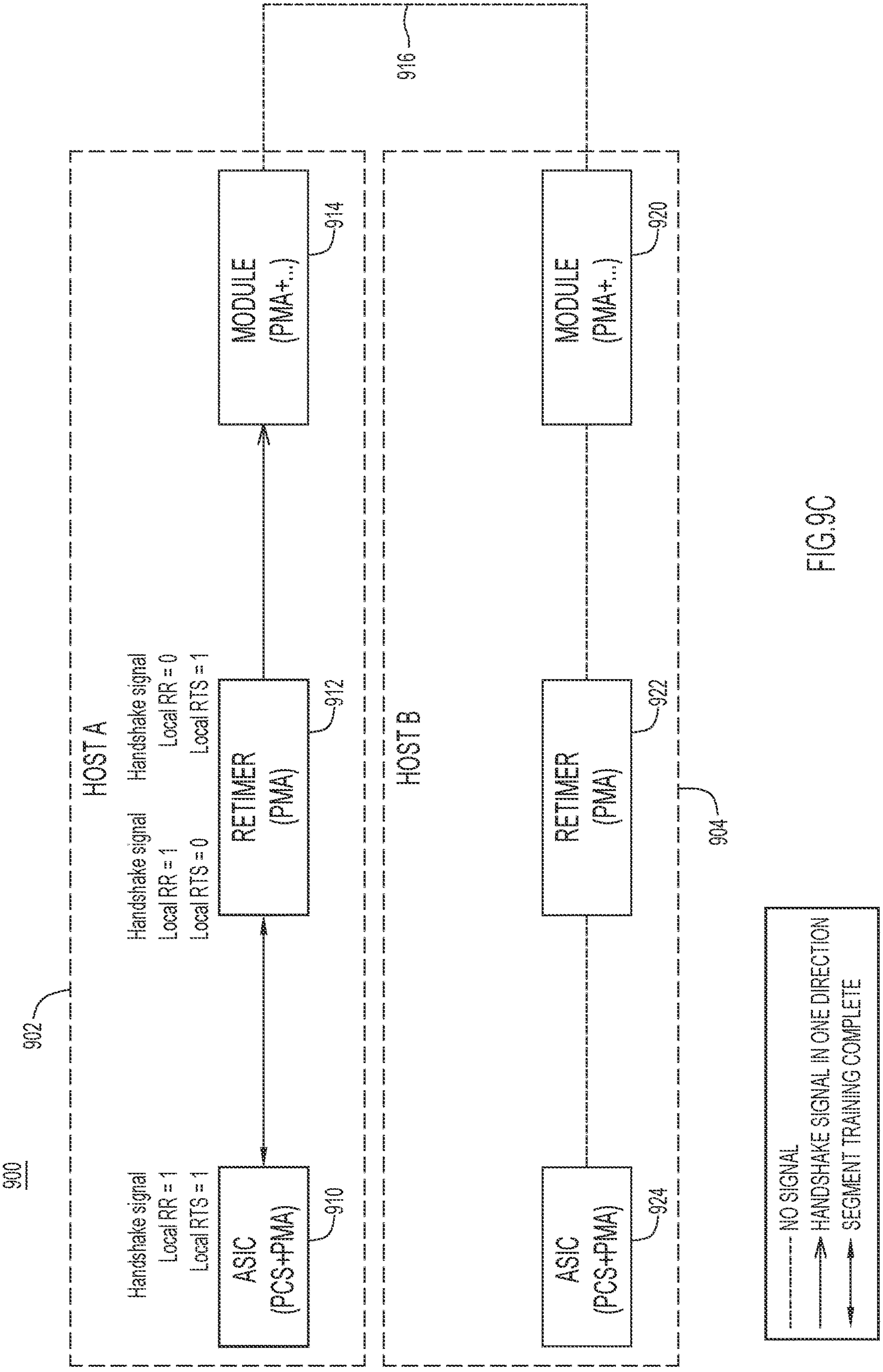

In FIG. 9C, the handshake between the ASIC 910 and the retimer 912 is successful. The Local RTS value of "1" on the interface of the ASIC 910 to the retimer 912 is propagated towards Host B, but the Local RTS value on the interface of the retimer 912 to the ASIC 910 is still false, so handshake signaling continues. The link is still down between Host A and Host B.

Figure 9D:
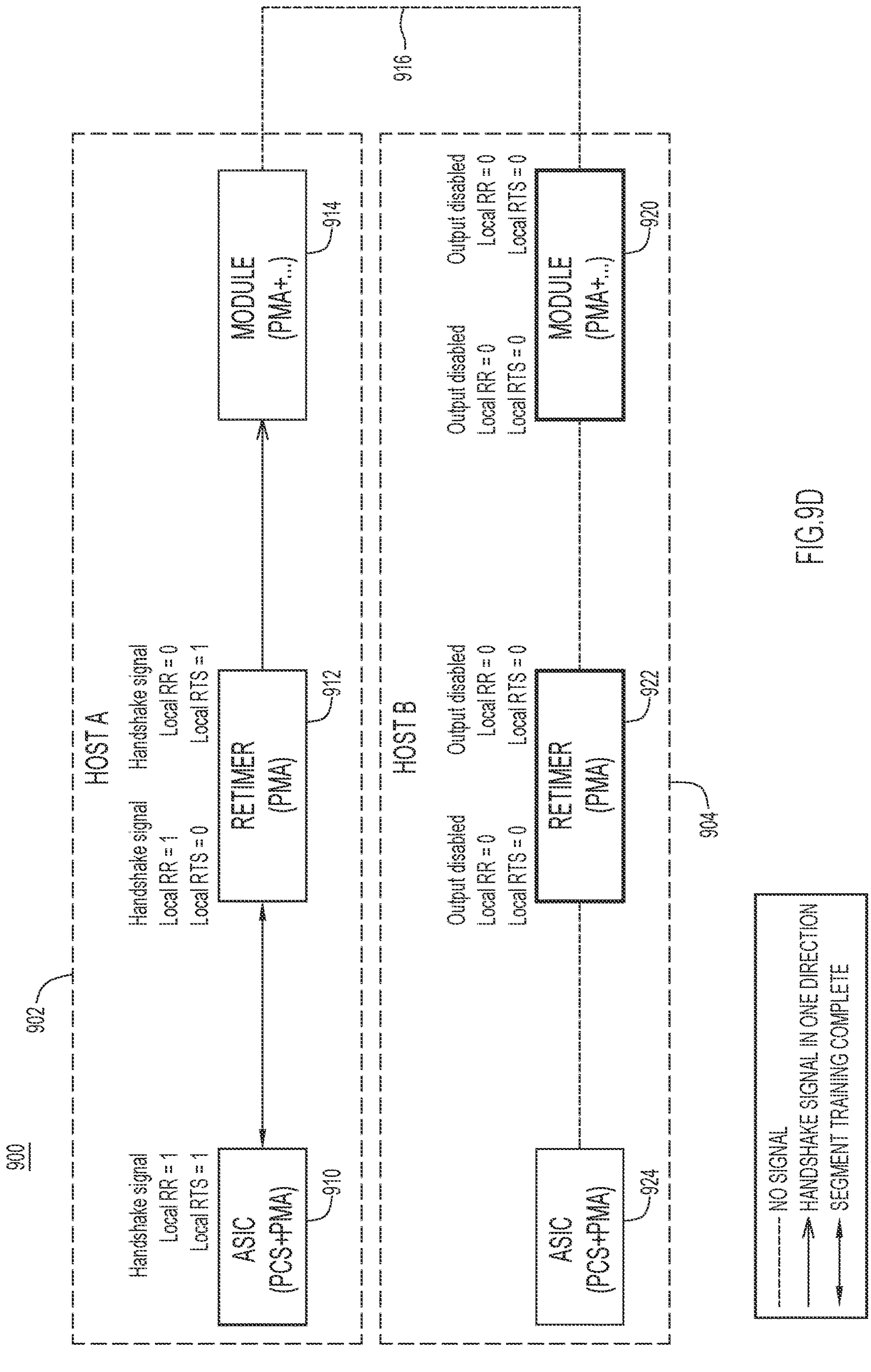

In FIG. 9D, the module 920 and the retimer 922 in Host B are activated, but they have no handshake functions. Since the signal detects of the module 920 and the retimer 922 are not triggered (off) at this point, they do not enable their outputs on the adjacent interfaces. The link is still down between Host A and Host B.

Figure 9E:
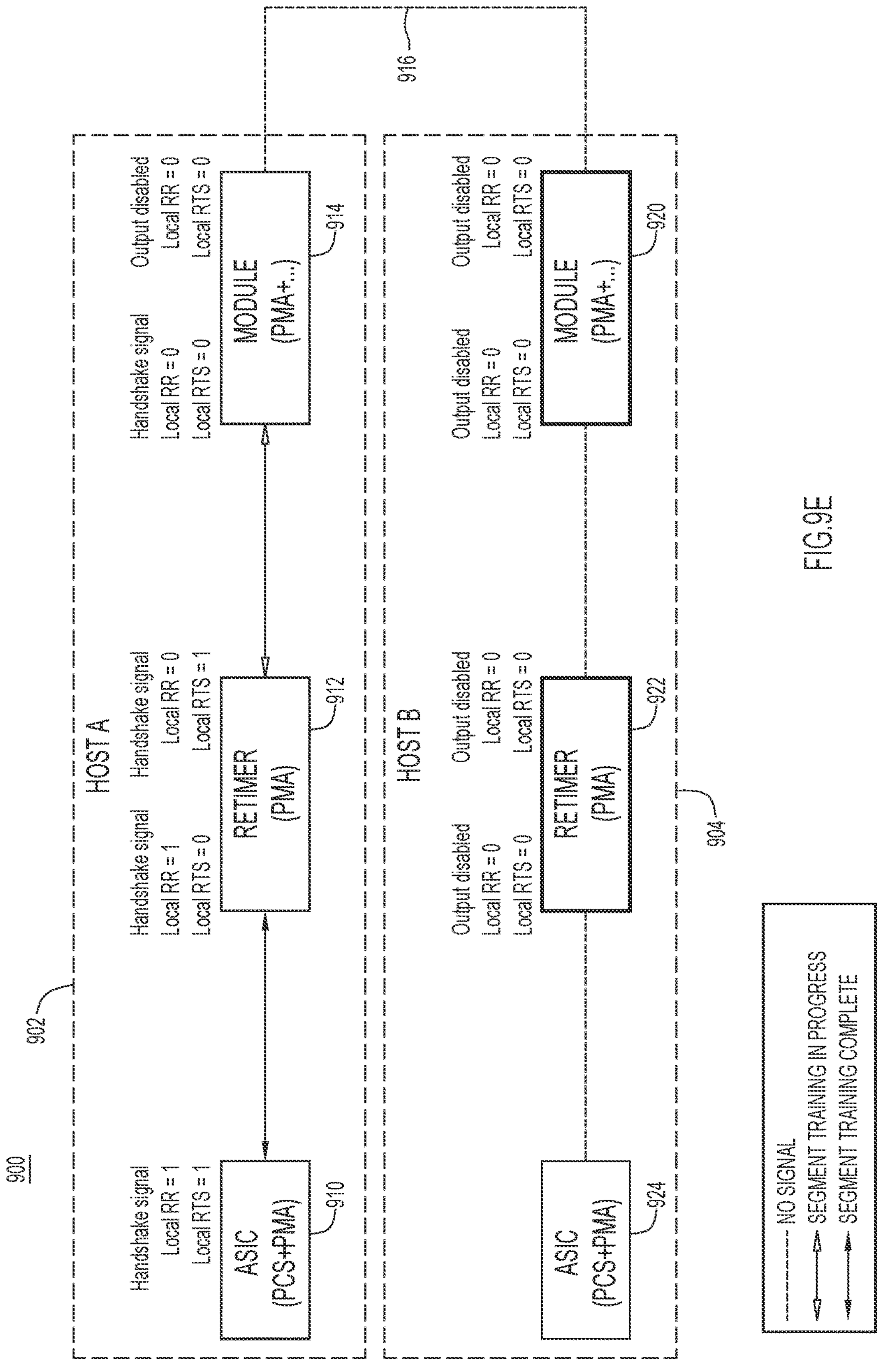

In FIG. 9E, the module 914 in Host A is activated and starts the handshake with the retimer 912. There is no handshake signaling with the module 920 in Host B, so the output from module 914 to the module 920 is disabled at this point. The link is still down between Host A and Host B.

Figure 9F:
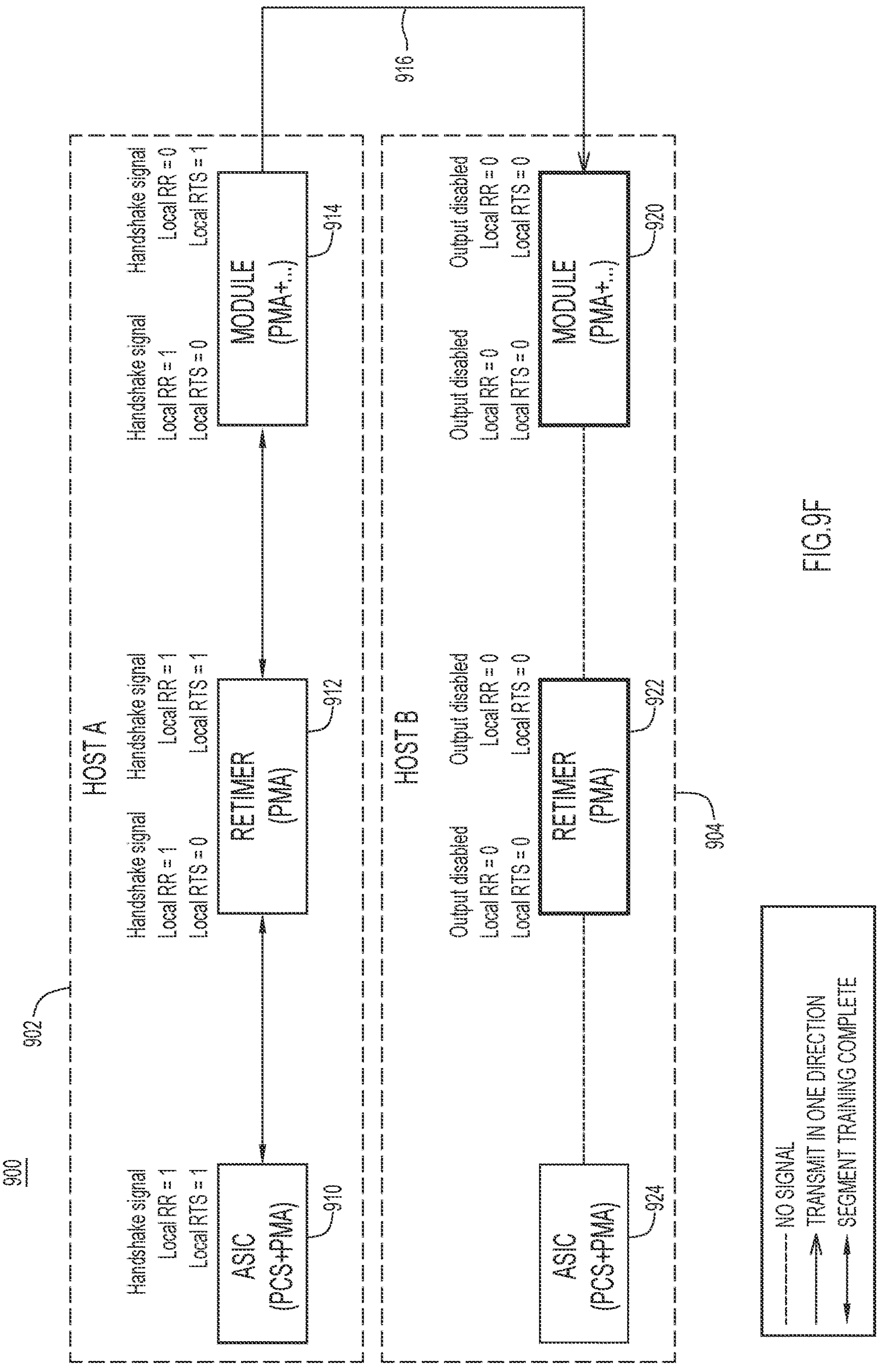

FIG. 9F shows that the handshake between the retimer 912 and the module 914 is successful, and the RTS=1 is propagated from the retimer 912 to the module 914. The RTS is further propagated toward Host B. However, since the module 920 in Host B does not know how to handle training frames, the module 914 does a handshake forwarding or sends a locally generated pattern, such as a PRBS pattern, to module 920, as described above in connection with FIGS. 5A and 5B. Specifically, module 914 has to enable (unsquelch) its transmitter to signal the RTS to module 920. The link is still down between Host A and Host B.

Figure 9G:
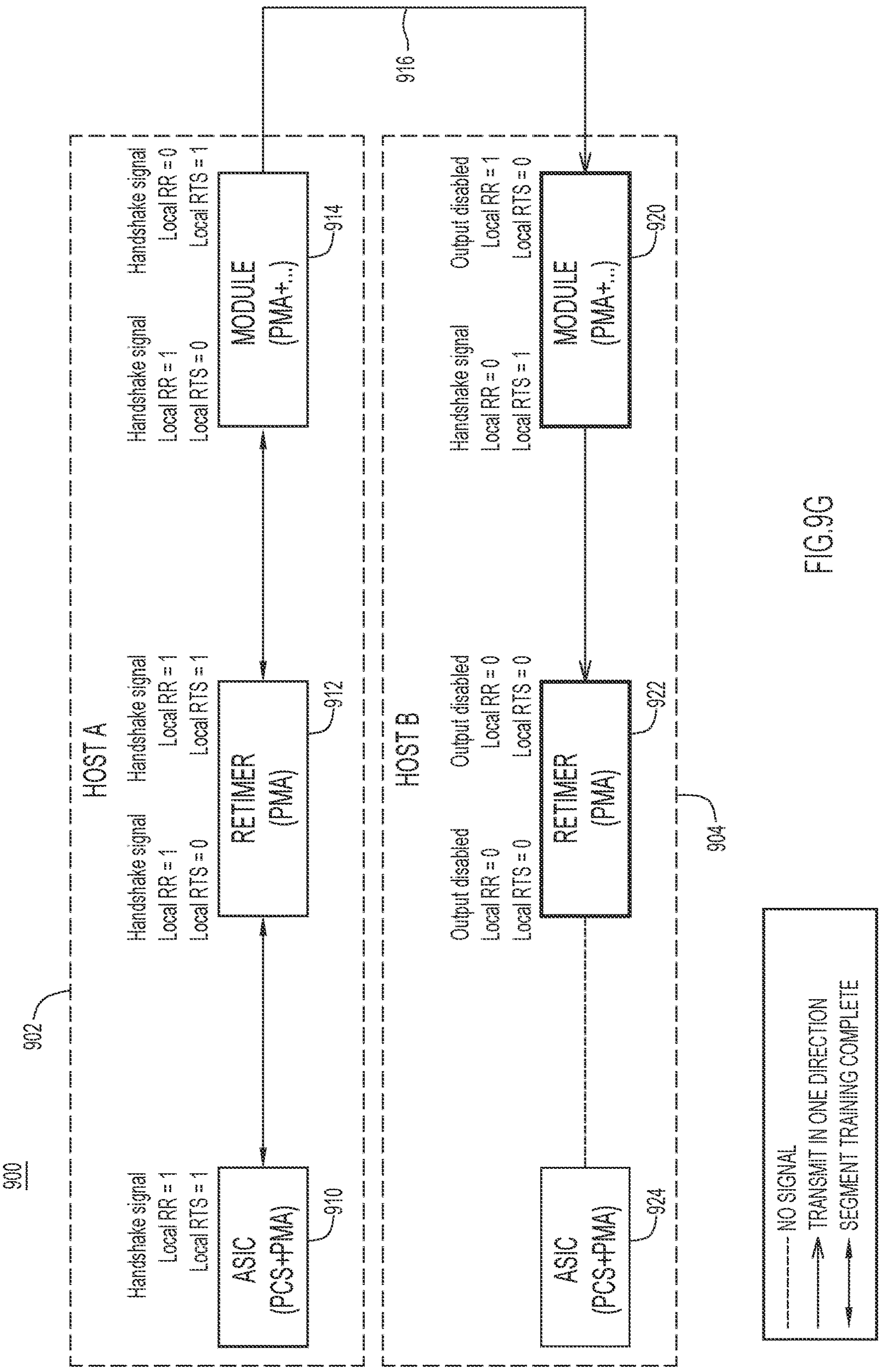

In FIG. 9G, the module 920 in Host B detects the incoming signal from the module 914 in Host A and forwards it to the retimer 922. Specifically, module 920 enables its output towards retimer 922. The output of the module 920 towards Host A is still disabled. The link is still down between Host A and Host B.

Figure 9H:
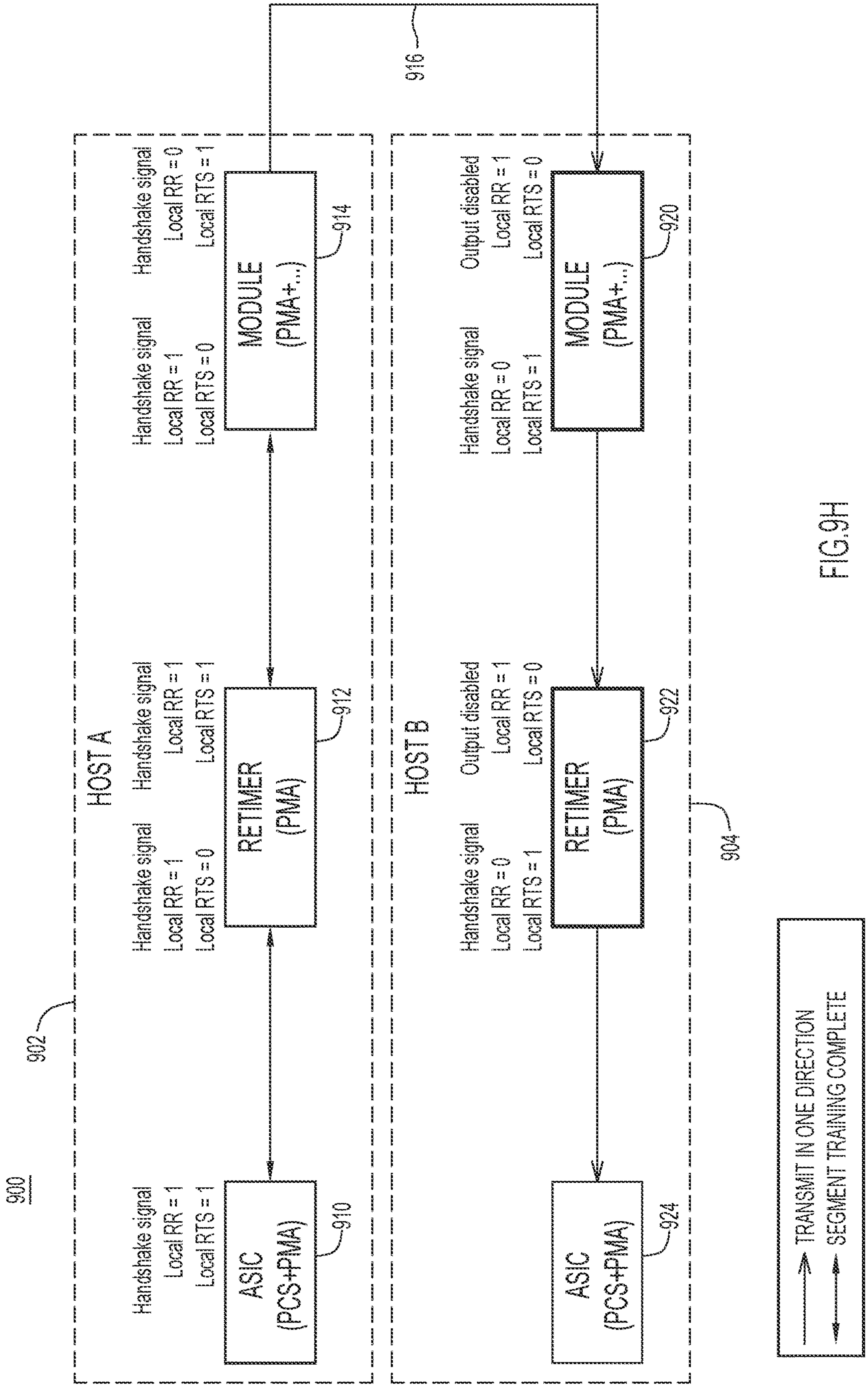

In FIG. 9H, the retimer 922 in Host B detects an incoming signal from the module 920 and enables its output towards the ASIC 924. The output from the retimer towards the module 920 is still disabled. The link is still down between Host A and Host B.

Figure 9I:
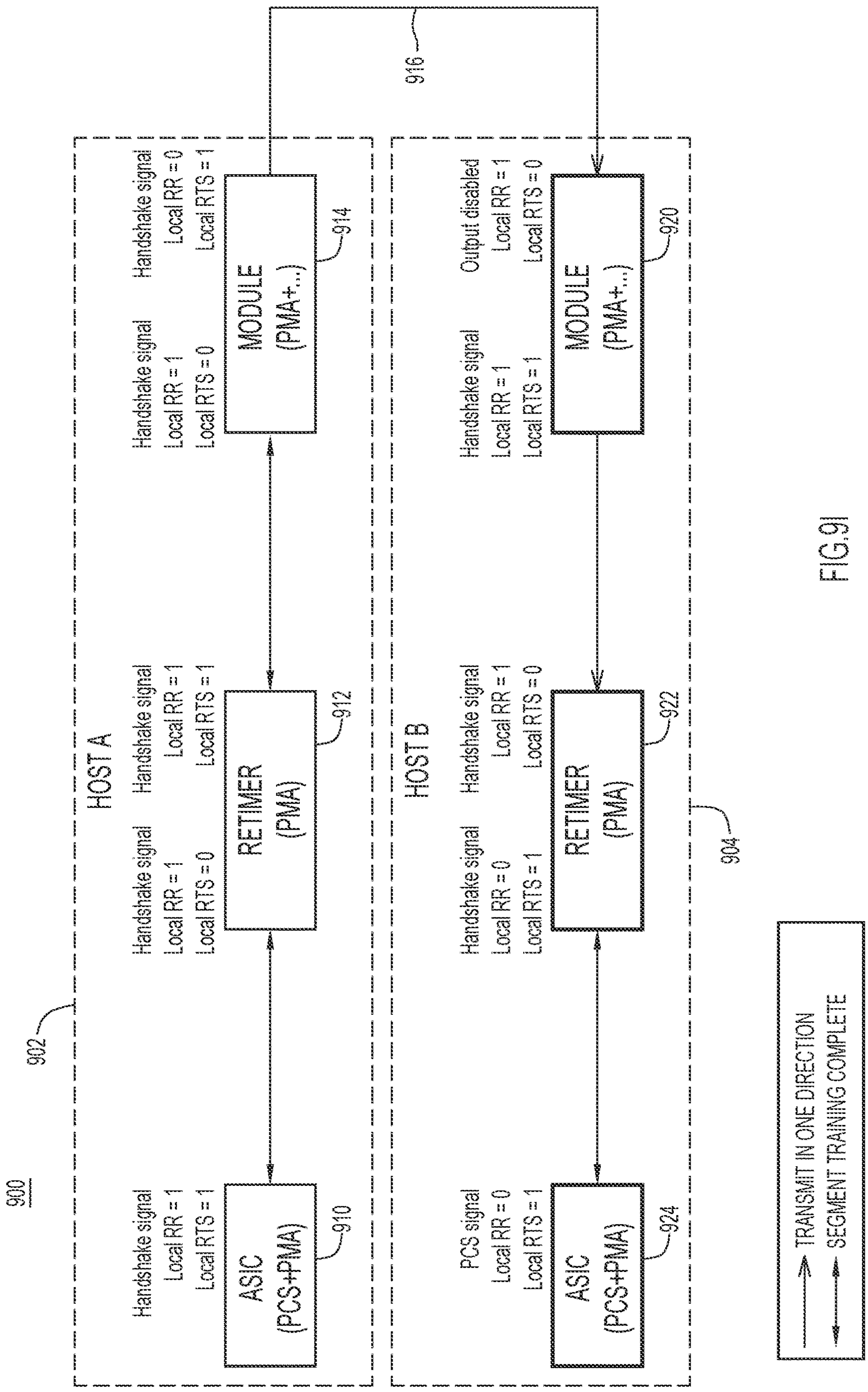

FIG. 9I shows that the ASIC 924 in Host B is activated and sends a signal towards retimer 922. Hence, Local RTS=1 on the interface of ASIC 924 towards retimer 922. The link is still down between Host A and Host B.

Figure 9J:
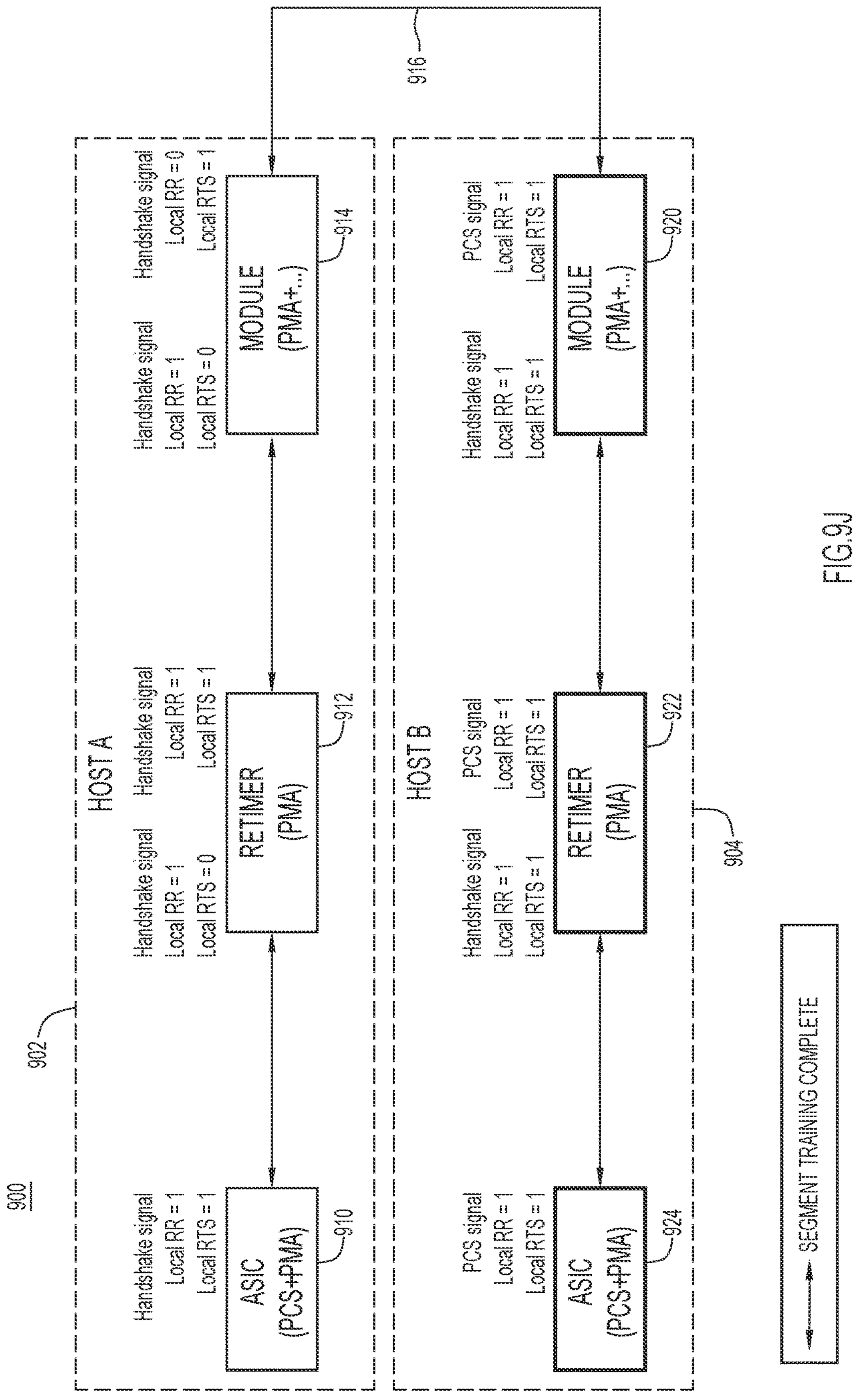

In FIG. 9J, the ASIC 924, retimer 922 and module 920 detect the incoming signals. The retimer 922 and the module 920 enable their outputs. That is, Local RTS is set to true on the interface from the retimer 922 towards the module 920, and the module 920 sets Local RTS to true on the interface of the module 920 towards the module 914. The link is still down between Host A and Host B.

Figure 9K:
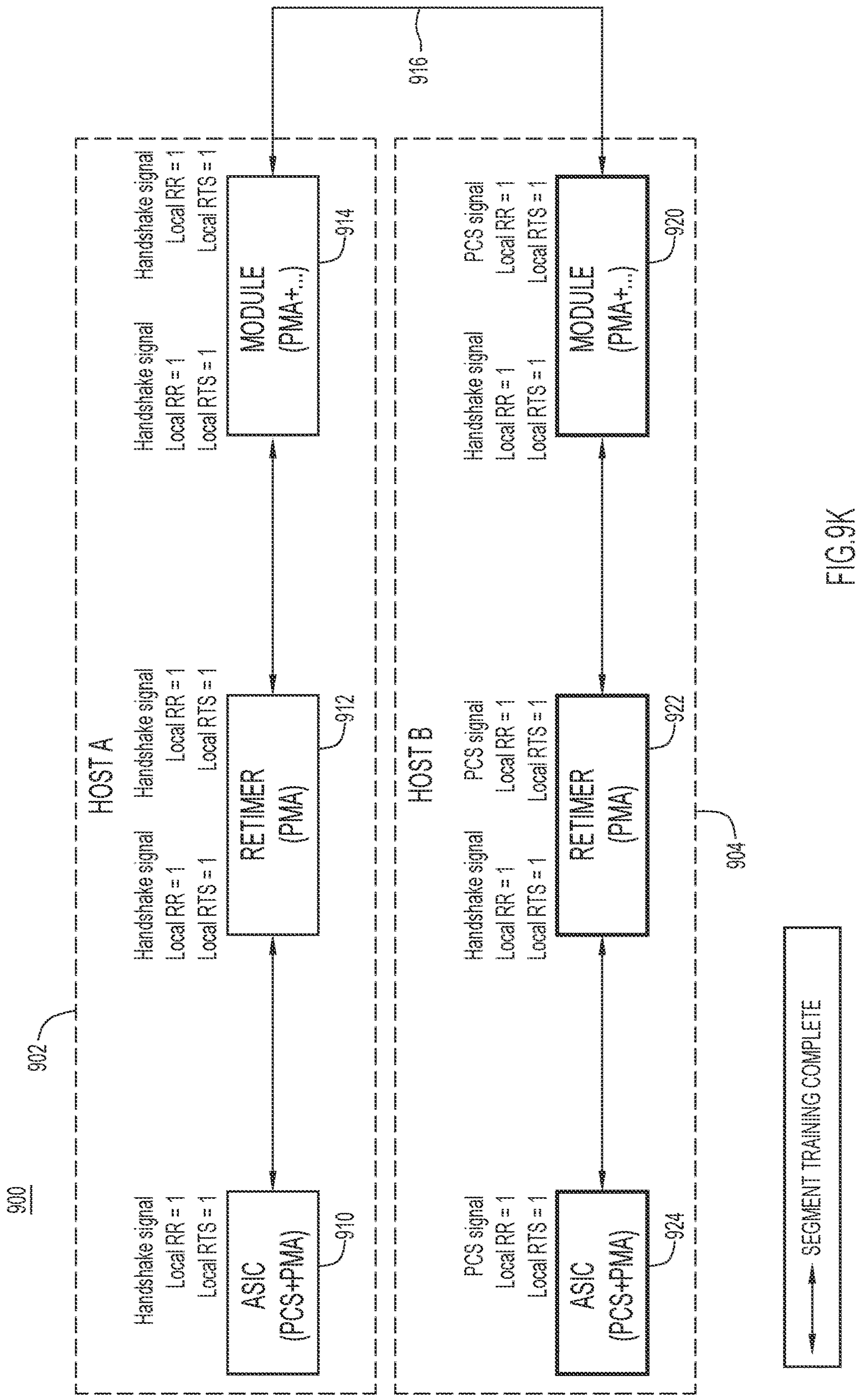

FIG. 9K shows that the module 914 detects the incoming signal from the module 920 in Host B, and propagates RTS through the retimer 912 to the ASIC 910. Local RR is set to true on the interface of module 914 towards module 920, Local RTS is set to true on the interface of module 914 towards retimer 912, and Local RTS is set to true on the interface of retimer 912 towards the ASIC 910. The link is still down between Host A and Host B.

Figure 9L:
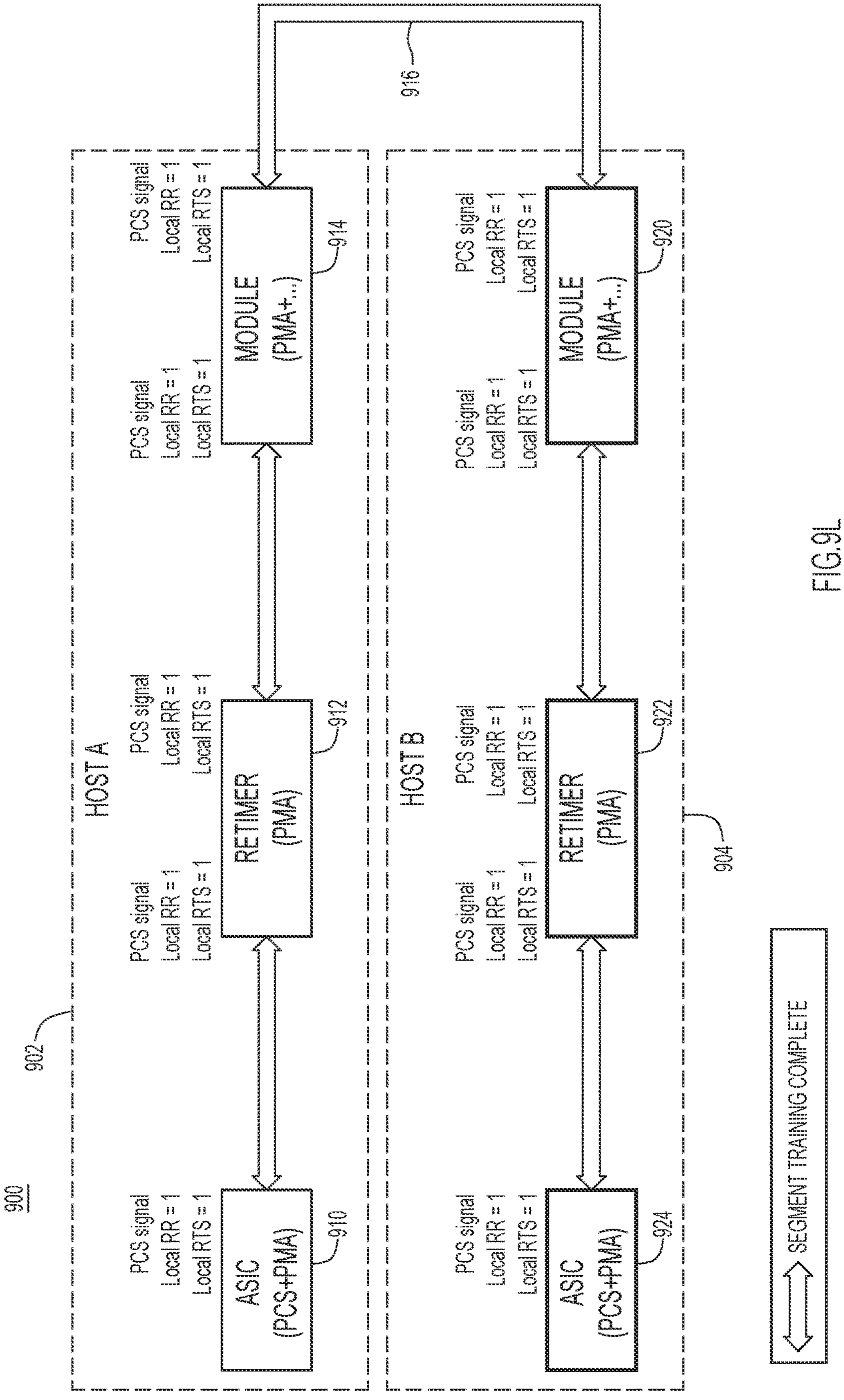

FIG. 9L shows that the module 914, retimer 912 and ASIC 910 detect that RTS is set to 1 in both directions. After a delay, the PMA functions in the ASIC 910, retimer 912 and module 914 switch to data operation. The link is now up between Host A and Host B.

Figure 10:
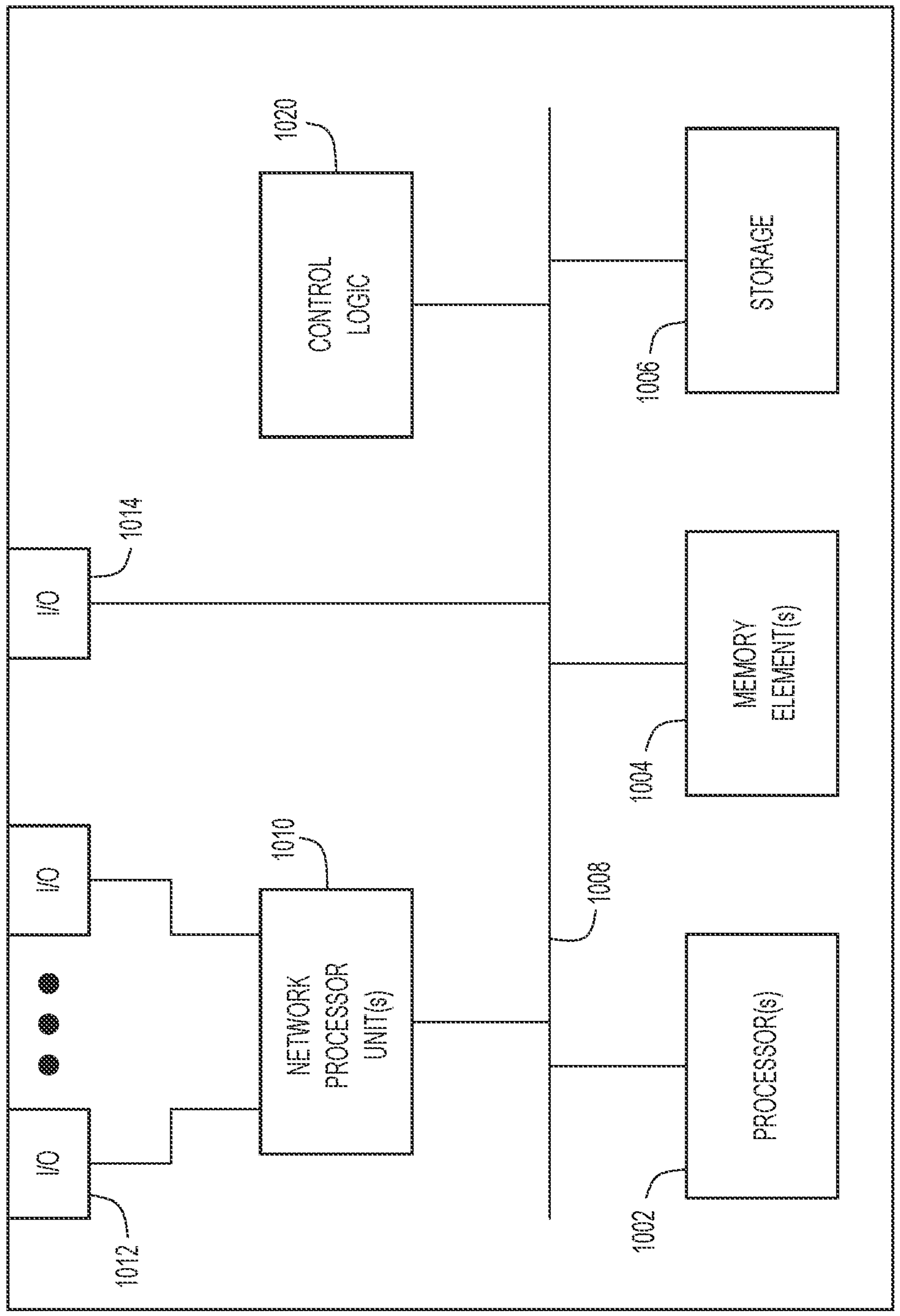
FIG. 10 is a block diagram of a device that may be configured to perform the techniques presented herein, according to an example embodiment.

Referring now to FIG. 10, a hardware block diagram is shown of a device 1000 that may perform functions associated with operations discussed herein in connection with the techniques presented herein. In various embodiments, the device 1000 may be a networking device, a computing device or any device that may be configured to perform networking communications using the techniques presented herein.

In at least one embodiment, the device 1000 may be any apparatus that may include one or more processor(s) 1002, one or more memory element(s) 1004, storage 1006, a bus 1008, one or more network processor unit(s) 1010 interconnected with one or more network input/output (I/O) interface(s) 1012, one or more I/O interface(s) 1014, and control logic 1020. In various embodiments, instructions associated with logic for device 1000 can overlap in any manner and are not limited to the specific allocation of instructions and/or operations described herein. Many of the components described herein may be implemented as part of the network processor unit(s) 1010, in digital logic gates, such as part of one or more integrated circuits.

In at least one embodiment, processor(s) 1002 is/are at least one hardware processor configured to execute various tasks, operations and/or functions for device 1000 as described herein according to software and/or instructions configured for device 1000. Processor(s) 1002 (e.g., a hardware processor) can execute any type of instructions associated with data to achieve the operations detailed herein. In one example, processor(s) 1002 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1004 and/or storage 1006 is/are configured to store data, information, software, and/or instructions associated with device 1000, and/or logic configured for memory element(s) 1004 and/or storage 1006. For example, any logic described herein (e.g., control logic 1020) can, in various embodiments, be stored for device 1000 using any combination of memory element(s) 1004 and/or storage 1006. Note that in some embodiments, storage 1006 can be consolidated with memory element(s) 1004 (or vice versa), or can overlap/exist in any other suitable manner. The control logic 1020 may include executable instructions that enable the processor(s) 1002 to perform one or more portions of the methods presented herein, so that the processor may serve as a "controller" for an apparatus that includes the components and capabilities described above in connection with FIGS. 1-7, 8A-8K and 9A-9L.

In one form, the operations described herein may be embodied in an apparatus that includes a memory; and one or more integrated circuits configured with digital logic, or a processor device configured with instructions, to perform operations including: on a network interface facing a segment partner, receiving incoming training frames from the segment partner and transmitting outgoing training frames to the segment partner; and including a ready-to-send indication in an outgoing training frame to be sent to the segment partner, wherein the ready-to-send indication indicates that the device has, on all lanes of the network interface, valid data and is ready to send data on the network interface to the segment partner.

Similarly, the operations described herein may be embodied in an apparatus that includes a memory; and one or more integrated circuits configured with digital logic, or a processor device configured with instructions, to perform operations including: on a first network interface facing a first segment partner, receiving incoming training frames from the first segment partner and transmitting outgoing training frames to the first segment partner; on a second network interface facing a second segment partner, receiving incoming training frames from the second segment partner and transmitting outgoing training frames to the second segment partner; first including a first ready-to-send indication, when the first ready-to-send indication is included in an incoming training frame received from the first segment partner, in an outgoing training frame to be sent to the second segment partner; and second including a second ready-to-send indication, when the second ready-to-send indication is included in an incoming training frame received from the second segment partner, in an outgoing training frame to be sent to the first segment partner.

Further still, the operations described herein may be embodied in an apparatus that includes a memory; and one or more integrated circuits configured with digital logic, or a processor device configured with instructions, to perform operations including: disabling a first transmitter on a first network interface of the device for a period of time; disabling a second transmitter on a second network interface of the device; on a first network interface facing a first segment partner, receiving incoming training frames from the first segment partner; after the period of time, enabling the first transmitter on the first network interface and transmitting outgoing training frames to the first segment partner; when a first ready-to-send indication is included in an incoming training frame received from the first segment partner, enabling the second transmitter and transmitting a binary pattern from a second network interface to a second segment partner; and when a receiver ready indication is determined for the second segment partner, including a second ready-to-send indication in an outgoing training frame transmitted to the first segment partner.

In at least one embodiment, bus 1008 can be configured as an interface that enables one or more elements of device 1000 to communicate in order to exchange information and/or data. Bus 1008 can be implemented with any architecture designed for passing control, data and/or information between processors, memory elements/storage, peripheral devices, and/or any other hardware and/or software components that may be configured for device 1000. In at least one embodiment, bus 1008 may be implemented as a fast kernel-hosted interconnect, potentially using shared memory between processes (e.g., logic), which can enable efficient communication paths between the processes.

In various embodiments, network processor unit(s) 1010 may enable communication between device 1000 and other systems, entities, etc., via network I/O interface(s) 1012 (wired and/or wireless, e.g., ports or interfaces) to facilitate operations discussed for various embodiments described herein. In various embodiments, network processor unit(s) 1010 can be configured to perform the network communication techniques presented herein as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 1000 and other systems, entities, etc. to facilitate operations for various embodiments described herein. In various embodiments, network I/O interface(s) 1012 can be configured as one or more Ethernet port(s), Fibre Channel ports, any other I/O port(s), and/or antenna(s)/antenna array(s) now known or hereafter developed. Thus, the network processor unit(s) 1010 and/or network I/O interface(s) 1012 may include suitable interfaces for receiving, transmitting, and/or otherwise communicating data and/or information in a network environment.

I/O interface(s) 1014 allow for input and output of data and/or information with other entities that may be connected to device 1000. For example, I/O interface(s) 1014 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1020 can include instructions that, when executed, cause processor(s) 1002 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1020) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is are capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1004 and/or storage 1006 can store data, software, code, instructions (e.g., processor instructions), logic, parameters, combinations thereof, and/or the like used for operations described herein. This includes memory element(s) 1004 and/or storage 1006 being able to store data, software, code, instructions (e.g., processor instructions), logic, parameters, combinations thereof, or the like that are executed to carry out operations in accordance with the teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In some aspects, the techniques described herein relate to a method performed by a device that is part of a multi-segment network link, the method including: on a network interface facing a segment partner, receiving incoming training frames from the segment partner and transmitting outgoing training frames to the segment partner; and including a ready-to-send indication in an outgoing training frame to be sent to the segment partner, wherein the ready-to-send indication indicates that the device has, on all lanes of the network interface, valid data and is ready to send data on the network interface to the segment partner.

In some aspects, the techniques described herein relate to a method, further including: determining when an incoming training frame received from the segment partner includes a receiver ready indication, wherein including includes including the ready-to-send indication when the device has a receiver ready indication and a received incoming training frame from the segment partner has a receiver ready indication on all lanes.

In some aspects, the techniques described herein relate to a method, wherein the ready-to-send indication is a single bit that is included in a bit of a status field of a training frame, a first state of the single bit indicating that no data is available and training is to continue and a second state of the single bit indicating to switch to data mode when training is complete.

In some aspects, the techniques described herein relate to a method, further including, when both the ready-to-send indication is included and a received incoming training frame from the segment partner has a receiver ready indication, after a period of time, switching the network interface from transmitting outgoing training frames to transmitting data.

In some aspects, the techniques described herein relate to a method performed by a device that is part of a multi-segment network link, the method including: on a first network interface facing a first segment partner, receiving incoming training frames from the first segment partner and transmitting outgoing training frames to the first segment partner; on a second network interface facing a second segment partner, receiving incoming training frames from the second segment partner and transmitting outgoing training frames to the second segment partner; first including a first ready-to-send indication, when the first ready-to-send indication is included in an incoming training frame received from the first segment partner, in an outgoing training frame to be sent to the second segment partner; and second including a second ready-to-send indication, when the second ready-to-send indication is included in an incoming training frame received from the second segment partner, in an outgoing training frame to be sent to the first segment partner.

In some aspects, the techniques described herein relate to a method, wherein the first ready-to-send indication indicates that the first segment partner has, on all lanes, valid data and is ready to send data to the device on the first network interface, and the second ready-to-send indication indicates that the second segment partner has, on all lanes, valid data and is ready to send data to the device on the second network interface.

In some aspects, the techniques described herein relate to a method, further including: determining when an incoming training frame received from the first segment partner includes an incoming receiver ready indication; and including an outgoing receiver ready indication in an outgoing training frame transmitted to the first segment partner, wherein the first including and the second including are performed when the incoming receiver ready indication is detected in an incoming training frame and when the outgoing receiver ready indication is included in an outgoing training frame.

In some aspects, the techniques described herein relate to a method, wherein the first including includes including the first ready-to-send indication in an outgoing training frame to be sent to the second segment partner when the device has a receiver ready indication and a received incoming training frame from the first segment partner has a receiver ready indication of the first segment partner on all lanes and a received incoming training frame from the second segment partner has a receiver ready indication of the second segment partner on all lanes.

In some aspects, the techniques described herein relate to a method, wherein the second including includes including the second ready-to-send indication in an outgoing training frame to the first segment partner when the device has a receiver ready indication and a received incoming training frame from the first segment partner has a receiver ready indication of the first segment partner on all lanes and a received incoming training frame from the second segment partner has a receiver ready indication of the second segment partner on all lanes.

In some aspects, the techniques described herein relate to a method, wherein the first ready-to-send indication is a single bit that is included in a bit of a status field of a training frame, a first state of the single bit indicating that no data is available and training is to continue and a second state of the single bit indicating to switch to data mode when training is complete.

In some aspects, the techniques described herein relate to a method, further including: when both the first ready-to-send indication and the second ready-to-send indication are received, after a period of time, switching the first network interface from transmitting outgoing training frames to transmitting data that is received from the second network interface, and switching the second network interface from transmitting outgoing training frames to transmitting data that is received from the first network interface.

In some aspects, the techniques described herein relate to a method performed by a device that is part of a multi-segment network link, the method including: disabling a first transmitter on a first network interface of the device for a period of time; disabling a second transmitter on a second network interface of the device; on a first network interface facing a first segment partner, receiving incoming training frames from the first segment partner; after the period of time, enabling the first transmitter on the first network interface and transmitting outgoing training frames to the first segment partner; when a first ready-to-send indication is included in an incoming training frame received from the first segment partner, enabling the second transmitter and transmitting a binary pattern from a second network interface to a second segment partner; and when a receiver ready indication is determined for the second segment partner, including a second ready-to-send indication in an outgoing training frame transmitted to the first segment partner.

In some aspects, the techniques described herein relate to a method, wherein the first ready-to-send indication indicates that the first segment partner has, on all lanes, valid data and is ready to send data to the device on the first network interface, wherein the second ready-to-send indication indicates that the second segment partner has, on all lanes, valid data, and is ready to send data to the device on the second network interface.

In some aspects, the techniques described herein relate to a method, wherein the first ready-to-send indication is a single bit that is included in a bit of a status field of a training frame, a first state of the single bit indicating that no data is available and training is to continue and a second state of the single bit indicating to switch to data mode when training is complete.

In some aspects, the techniques described herein relate to a method, further including: when the first ready-to-send indication is received and the second ready-to-send indication is included in an outgoing training frame to the first segment partner, after a period of time, switching the first network interface from transmitting outgoing training frames to transmitting data that is received from the second network interface, and switching the second network interface from transmitting the binary pattern to transmitting data that is received from the first network interface.

In some aspects, the techniques described herein relate to a method, wherein the binary pattern is a pseudorandom binary sequence.

In some aspects, the techniques described herein relate to an apparatus including: a first network interface; a first transmitter and a first receiver associated with the first network interface; a second network interface; a second transmitter and a second receiver associated with the second network interface; a first training frame generator and a first training frame decoder associated with the first network interface; a second training frame generator and a second training frame decoder associated with the second network interface; and a controller coupled to the first training frame generator, the first training frame decoder, the second training frame generator and the second training frame decoder, wherein the controller is configured to: cause the first training frame generator to transmit outgoing training frames to a first segment partner via the first network interface and obtain training frame content obtained by the first training frame decoder from incoming training frames received from the first segment partner; cause the second training frame generator to transmit outgoing training frames to a second segment partner via the second network interface and obtain training frame content obtained by the second training frame decoder from incoming training frames received from the second segment partner; when a first ready-to-send indication is determined to be included in an incoming training frame received from the first segment partner, cause the second training frame generator to include the first ready-to-send indication in an outgoing training frame to be sent to the second segment partner; and when a second ready-to-send indication is determined to be included in an incoming training frame received from the second segment partner, cause the first training frame generator to include the second ready-to-send indication in an outgoing training frame to be sent to the first segment partner.

In some aspects, the techniques described herein relate to an apparatus, wherein the first ready-to-send indication indicates that the first segment partner has, on all lanes, valid data and is ready to send data to the apparatus on the first network interface, and the second ready-to-send indication indicates that the second segment partner has, on all lanes, valid data and is ready to send data to the apparatus on the second network interface.

In some aspects, the techniques described herein relate to an apparatus, wherein the controller is further configured to: determine when an incoming training frame received from the first segment partner includes an incoming receiver ready indication; and cause the first training frame generator to include an outgoing receiver ready indication in an outgoing training frame transmitted to the first segment partner, wherein the controller controls the first training frame generator to include the first ready-to-send indication and controls the second training frame generator to include the second ready-to-send indication when the incoming receiver ready indication is detected in an incoming training frame and when the outgoing receiver ready indication is included in an outgoing training frame.

In some aspects, the techniques described herein relate to an apparatus, wherein the controller causes the first training frame generator to include the first ready-to-send indication in an outgoing training frame to be sent to the second segment partner when the apparatus has a receiver ready indication and a received incoming training frame from the first segment partner has a receiver ready indication of the first segment partner on all lanes and a received incoming training frame from the second segment partner has a receiver ready indication of the second segment partner on all lanes.

In some aspects, the techniques described herein relate to an apparatus, wherein the controller causes the second training frame generator to include the second ready-to-send indication in an outgoing training frame to the first segment partner when the apparatus has a receiver ready indication and a received incoming training frame from the first segment partner has a receiver ready indication of the first segment partner on all lanes and a received incoming training frame from the second segment partner has a receiver ready indication of the second segment partner on all lanes.

In some aspects, the techniques described herein relate to an apparatus, wherein the first ready-to-send indication is a single bit that is included in a bit of a status field of a training frame, a first state of the single bit indicating that no data is available and training is to continue and a second state of the single bit indicating to switch to data mode when training is complete.

In some aspects, the techniques described herein relate to an apparatus, wherein the controller is configured to: when both the first ready-to-send indication and the second ready-to-send indication are received, after a period of time, switch the first network interface from transmitting outgoing training frames to transmitting data that is received from the second network interface, and switch the second network interface from transmitting outgoing training frames to transmitting data that is received from the first network interface.

In some aspects, the techniques described herein relate to an apparatus including: a first network interface; a first transmitter and a first receiver associated with the first network interface; a second network interface; a second transmitter and a second receiver associated with the second network interface; a training frame generator and a training frame decoder associated with the first network interface; a binary pattern generator and a signal detector associated with the second network interface; and a controller coupled to the training frame generator, the training frame decoder, the binary pattern generator and the signal detector, wherein the controller is configured to: disable the first transmitter on the first network interface for a period of time; disable the second transmitter on the second network interface; cause the training frame generator to obtain training frame content obtained by the training frame decoder from incoming training frames received from a first segment partner; after the period of time, enable the first transmitter on the first network interface and cause the training frame generator to transmit outgoing training frames to the first segment partner; when a first ready-to-send indication is determined to be included in an incoming training frame received from the first segment partner, enable the second transmitter and cause the binary pattern generator to generate a binary pattern to be transmitted via the second network interface to a second segment partner; and cause the training frame generator to include a second ready-to-send indication in an outgoing training frame to be transmitted to the first segment partner when a receiver ready indication is determined for the second segment partner based on an output from the signal detector.

In some aspects, the techniques described herein relate to an apparatus, wherein the first ready-to-send indication indicates that the first segment partner has, on all lanes, valid data and is ready to send data to the apparatus on the first network interface, wherein the second ready-to-send indication indicates that the second segment partner has, on all lanes, valid data, and is ready to send data to the apparatus on the second network interface.

In some aspects, the techniques described herein relate to an apparatus, wherein the first ready-to-send indication is a single bit that is included in a bit of a status field of a training frame, a first state of the single bit indicating that no data is available and training is to continue and a second state of the single bit indicating to switch to data mode when training is complete.

In some aspects, the techniques described herein relate to an apparatus, wherein when both the first ready-to-send indication is received and the second ready-to-send indication is included in an outgoing training frame to the first segment partner, after a period of time, the controller switches the first network interface from transmitting outgoing training frames to transmitting data that is received from the second network interface, and switches the second network interface from transmitting the binary pattern to transmitting data that is received from the first network interface.

In some aspects, the techniques described herein relate to an apparatus, wherein the binary pattern is a pseudorandom binary sequence.

Further, in some aspects, one or more non-transitory computer readable storage media may be provided, that is encoded with instructions, that when executed by one or more processors, cause the one or processors to perform operations of the methods presented herein.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method performed by a device that is part of a multi-segment network link, the method comprising:

during a link training process by which the device and a segment partner transmit signals from their respective transmitters to the other to enable adjusting one or more transmit parameters to achieve a desired performance of their respective receivers:

on a network interface facing a segment partner, receiving incoming training frames from the segment partner and transmitting outgoing training frames to the segment partner;

determining when an incoming training frame received from the segment partner includes a receiver ready indication; and when the device has a receiver ready indication and a received incoming training frame from the segment partner has a receiver ready indication on all lanes of the network interface, including a ready-to-send indication in an outgoing training frame to be sent to the segment partner, wherein the ready-to-send indication indicates that the device has, on all lanes of the network interface, valid data and is ready to send data on the network interface to the segment partner.

2. The method of claim 1, wherein the ready-to-send indication is a single bit that is included in a bit of a status field of a training frame, a first state of the single bit indicating that no data is available and training is to continue and a second state of the single bit indicating to switch to data mode when training is complete.

3. The method of claim 1, further comprising, when both the ready-to-send indication is included and a received incoming training frame from the segment partner has a receiver ready indication, after a period of time, switching the network interface from transmitting outgoing training frames to transmitting data.

4. The method of claim 1, wherein the ready-to-send indication is encoded in a reserved bit of a status field of the outgoing training frame such that a first state of the reserved bit indicates that the ready-to-send indication is not asserted and link training is to continue, and a second state of the reserved bit, opposite to the first state, indicates that the ready-to-send indication is asserted and the device is ready to switch to data mode.

5. A method performed by a device that is part of a multi-segment network link, the method comprising:

during a link training process by which the device and a segment partner transmit signals from their respective transmitters to the other to enable adjusting one or more transmit parameters to achieve a desired performance of their respective receivers:

on a first network interface facing a first segment partner, receiving incoming training frames from the first segment partner and transmitting outgoing training frames to the first segment partner;

on a second network interface facing a second segment partner, receiving incoming training frames from the second segment partner and transmitting outgoing training frames to the second segment partner;

determining when an incoming training frame received from the first segment partner includes an incoming receiver ready indication; and providing an outgoing receiver ready indication in an outgoing training frame transmitted to the first segment partner;

when the incoming receiver ready indication is detected in an incoming training frame and when the outgoing receiver ready indication is included in an outgoing training frame:

providing a first ready-to-send indication in an outgoing training frame to be sent to the second segment partner; and providing a second ready-to-send indication in an outgoing training frame to be sent to the first segment partner.

6. The method of claim 5, wherein the first ready-to-send indication indicates that the first segment partner has, on all lanes, valid data and is ready to send data to the device on the first network interface, and the second ready-to-send indication indicates that the second segment partner has, on all lanes, valid data and is ready to send data to the device on the second network interface.

7. The method of claim 5, wherein the first ready-to-send indication is provided in an outgoing training frame to be sent to the second segment partner when the device has a receiver ready indication and a received incoming training frame from the first segment partner has a receiver ready indication on all lanes and a received incoming training frame from the second segment partner has a receiver ready indication of the second segment partner on all lanes.

8. The method of claim 5, wherein the second ready-to-send indication is provided in an outgoing training frame to the first segment partner when the device has a receiver ready indication and a received incoming training frame from the first segment partner has a receiver ready indication of the first segment partner on all lanes and a received incoming training frame from the second segment partner has a receiver ready indication of the second segment partner on all lanes.

9. The method of claim 5, wherein the first ready-to-send indication is a single bit that is included in a bit of a status field of a training frame, a first state of the single bit indicating that no data is available and training is to continue and a second state of the single bit indicating to switch to data mode when training is complete.

10. The method of claim 5, further comprising:

when both the first ready-to-send indication and the second ready-to-send indication are received, after a period of time, switching the first network interface from transmitting outgoing training frames to transmitting data that is received from the second network interface, and switching the second network interface from transmitting outgoing training frames to transmitting data that is received from the first network interface.

11. The method of claim 5, further comprising, after both the first ready-to-send indication and the second ready-to-send indication are received, waiting a hold off period before switching the first network interface and the second network interface from transmitting outgoing training frames to transmitting data.

12. A method performed by a device that is part of a multi-segment network link, the method comprising:

disabling a first transmitter on a first network interface of the device for a period of time;

disabling a second transmitter on a second network interface of the device;

during a link training process by which the device and a segment partner transmit signals from their respective transmitters to the other to enable adjusting one or more transmit parameters to achieve a desired performance of their respective receivers:

on a first network interface facing a first segment partner, receiving incoming training frames from the first segment partner;

after the period of time, enabling the first transmitter on the first network interface and transmitting outgoing training frames to the first segment partner;

when a first ready-to-send indication is included in an incoming training frame received from the first segment partner, enabling the second transmitter and transmitting a binary pattern from a second network interface to a second segment partner; and when a receiver ready indication is determined for the second segment partner from incoming training frames received from the second segment partner, providing a second ready-to-send indication in an outgoing training frame transmitted to the first segment partner.

13. The method of claim 12, wherein the first ready-to-send indication indicates that the first segment partner has, on all lanes, valid data and is ready to send data to the device on the first network interface, wherein the second ready-to-send indication indicates that the second segment partner has, on all lanes, valid data, and is ready to send data to the device on the second network interface.

14. The method of claim 12, wherein the first ready-to-send indication is a single bit that is included in a bit of a status field of a training frame, a first state of the single bit indicating that no data is available and training is to continue and a second state of the single bit indicating to switch to data mode when training is complete.

15. The method of claim 12, further comprising:

when the first ready-to-send indication is received and the second ready-to-send indication is included in an outgoing training frame to the first segment partner, after a period of time, switching the first network interface from transmitting outgoing training frames to transmitting data that is received from the second network interface, and switching the second network interface from transmitting the binary pattern to transmitting data that is received from the first network interface.

16. The method of claim 12, wherein the binary pattern is a pseudorandom binary sequence.

17. An apparatus comprising:

a first network interface;

a first transmitter and a first receiver associated with the first network interface;

a second network interface;

a second transmitter and a second receiver associated with the second network interface;

a first training frame generator and a first training frame decoder associated with the first network interface;

a second training frame generator and a second training frame decoder associated with the second network interface; and a controller coupled to the first training frame generator, the first training frame decoder, the second training frame generator and the second training frame decoder, wherein the controller is configured to, during a link training process by which the apparatus and its segment partners transmit signals to each other to enable adjusting one or more transmit parameters to achieve a desired performance of their respective receivers:

cause the first training frame generator to transmit outgoing training frames to a first segment partner via the first network interface and obtain training frame content obtained by the first training frame decoder from incoming training frames received from the first segment partner;

cause the second training frame generator to transmit outgoing training frames to a second segment partner via the second network interface and obtain training frame content obtained by the second training frame decoder from incoming training frames received from the second segment partner;

determine when an incoming training frame received from the first segment partner includes an incoming receiver ready indication;

cause the first training frame generator to include an outgoing receiver ready indication in an outgoing training frame transmitted to the first segment partner;

when the incoming receiver ready indication is detected in an incoming training frame and when the outgoing receiver ready indication is included in an outgoing training frame:

when a first ready-to-send indication is determined to be included in an incoming training frame received from the first segment partner, cause the second training frame generator to include the first ready-to-send indication in an outgoing training frame to be sent to the second segment partner; and when a second ready-to-send indication is determined to be included in an incoming training frame received from the second segment partner, cause the first training frame generator to include the second ready-to-send indication in an outgoing training frame to be sent to the first segment partner.

18. The apparatus of claim 17, wherein the first ready-to-send indication indicates that the first segment partner has, on all lanes, valid data and is ready to send data to the apparatus on the first network interface, and the second ready-to-send indication indicates that the second segment partner has, on all lanes, valid data and is ready to send data to the apparatus on the second network interface.

19. The apparatus of claim 17, wherein the controller causes the first training frame generator to include the first ready-to-send indication in an outgoing training frame to be sent to the second segment partner when the apparatus has a receiver ready indication and a received incoming training frame from the first segment partner has a receiver ready indication of the first segment partner on all lanes and a received incoming training frame from the second segment partner has a receiver ready indication of the second segment partner on all lanes.

20. The apparatus of claim 17, wherein the controller causes the second training frame generator to include the second ready-to-send indication in an outgoing training frame to the first segment partner when the apparatus has a receiver ready indication and a received incoming training frame from the first segment partner has a receiver ready indication of the first segment partner on all lanes and a received incoming training frame from the second segment partner has a receiver ready indication of the second segment partner on all lanes.

21. The apparatus of claim 17, wherein the first ready-to-send indication is a single bit that is included in a bit of a status field of a training frame, a first state of the single bit indicating that no data is available and training is to continue and a second state of the single bit indicating to switch to data mode when training is complete.

22. The apparatus of claim 17, wherein the controller is configured to:

when both the first ready-to-send indication and the second ready-to-send indication are received, after a period of time, switch the first network interface from transmitting outgoing training frames to transmitting data that is received from the second network interface, and switch the second network interface from transmitting outgoing training frames to transmitting data that is received from the first network interface.

23. An apparatus comprising:

a first network interface;

a first transmitter and a first receiver associated with the first network interface;

a second network interface;

a second transmitter and a second receiver associated with the second network interface;

a training frame generator and a training frame decoder associated with the first network interface;

a binary pattern generator and a signal detector associated with the second network interface; and a controller coupled to the training frame generator, the training frame decoder, the binary pattern generator and the signal detector, wherein the controller is configured to, during a link training process by which the apparatus and its segment partners transmit signals to each other to enable adjusting one or more transmit parameters to achieve a desired performance of their respective receivers:

disable the first transmitter on the first network interface for a period of time;

disable the second transmitter on the second network interface;

cause the training frame generator to obtain training frame content obtained by the training frame decoder from incoming training frames received from a first segment partner;

after the period of time, enable the first transmitter on the first network interface and cause the training frame generator to transmit outgoing training frames to the first segment partner;

when a first ready-to-send indication is determined to be included in an incoming training frame received from the first segment partner, enable the second transmitter and cause the binary pattern generator to generate a binary pattern to be transmitted via the second network interface to a second segment partner; and cause the training frame generator to include a second ready-to-send indication in an outgoing training frame to be transmitted to the first segment partner when a receiver ready indication is determined for the second segment partner based on an output from the signal detector indicating that a receiver ready indication is included in an incoming training frame from the second segment partner.

24. The apparatus of claim 23, wherein the first ready-to-send indication indicates that the first segment partner has, on all lanes, valid data and is ready to send data to the apparatus on the first network interface, wherein the second ready-to-send indication indicates that the second segment partner has, on all lanes, valid data, and is ready to send data to the apparatus on the second network interface.

25. The apparatus of claim 23, wherein the first ready-to-send indication is a single bit that is included in a bit of a status field of a training frame, a first state of the single bit indicating that no data is available and training is to continue and a second state of the single bit indicating to switch to data mode when training is complete.

26. The apparatus of claim 23, wherein when both the first ready-to-send indication is received and the second ready-to-send indication is included in an outgoing training frame to the first segment partner, after a period of time, the controller switches the first network interface from transmitting outgoing training frames to transmitting data that is received from the second network interface, and switches the second network interface from transmitting the binary pattern to transmitting data that is received from the first network interface.

27. The apparatus of claim 23, wherein the binary pattern is a pseudorandom binary sequence.

* * * * *